United States Patent
Felton et al.

(10) Patent No.: US 11,725,881 B2
(45) Date of Patent: Aug. 15, 2023

(54) CORE BODY FOR TRANSFER APPARATUS

(71) Applicant: Transportation IP Holdings, LLC, Norwalk, CT (US)

(72) Inventors: Adam C. Felton, Grove City, PA (US); Kevin Bailey, Mercer, PA (US); Manuel Licon Flores, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 17/524,536

(22) Filed: Nov. 11, 2021

(65) Prior Publication Data
US 2022/0333870 A1  Oct. 20, 2022

Related U.S. Application Data

(60) Provisional application No. 63/176,961, filed on Apr. 20, 2021.

(51) Int. Cl.
| | |
|---|---|
| *F28F 7/02* | (2006.01) |
| *F28D 7/00* | (2006.01) |
| *F28D 9/02* | (2006.01) |
| *F28F 9/02* | (2006.01) |
| *F28D 21/00* | (2006.01) |
| *B33Y 80/00* | (2015.01) |

(52) U.S. Cl.
CPC ............ *F28D 7/0016* (2013.01); *F28D 9/02* (2013.01); *F28D 21/0015* (2013.01); *F28F 7/02* (2013.01); *F28F 9/0202* (2013.01); *B33Y 80/00* (2014.12); *F28F 2210/02* (2013.01)

(58) Field of Classification Search
CPC .......... F28F 7/02; F28F 2210/02; F28F 13/06; B33Y 80/00; F28D 21/0015
See application file for complete search history.

(56) References Cited

U.S. PATENT DOCUMENTS

| | | | |
|---|---|---|---|
| 2016/0202003 A1 | 7/2016 | Gerstler et al. | |
| 2018/0187984 A1* | 7/2018 | Manzo | F28F 7/02 |
| 2018/0297843 A1* | 10/2018 | Lo | B01J 19/243 |
| 2020/0033070 A1 | 1/2020 | Vlahinos et al. | |
| 2020/0189046 A1 | 6/2020 | Ravindranath et al. | |
| 2020/0191045 A1 | 6/2020 | Gubba et al. | |

(Continued)

OTHER PUBLICATIONS

Extended European Search Report for related European Patent App. No. 22168372.5 dated Aug. 30, 2022 (11 pages).

*Primary Examiner* — Eric S Ruppert
(74) *Attorney, Agent, or Firm* — The Small Patent Law Group LLC; Philip S. Hof

(57) ABSTRACT

A core body includes a structure having a plurality of connected unit cells. At least one unit cell has one or more sidewalls that are curved and define a portion of an inner passageway within and through the unit cell. The one or more sidewalls define multiple orifices and include a cone disposed between at least some of the orifices. A dimple is defined along an outer surface of the unit cell at the cone. The outer surface at least partially defines an outer passageway that is sealed from the inner passageway by the one or more sidewalls. The one or more sidewalls are configured to transport one or more of thermal energy from a first fluid or a component of the first fluid flowing in the inner passageway to a second fluid flowing in the outer passageway without the first fluid mixing with the second fluid.

20 Claims, 16 Drawing Sheets

(56) References Cited

U.S. PATENT DOCUMENTS

| | | |
|---|---|---|
| 2020/0200482 A1* | 6/2020 | Koeune .................... F28D 7/10 |
| 2020/0251259 A1 | 8/2020 | Rao et al. |
| 2020/0298652 A1 | 9/2020 | Bonar et al. |
| 2020/0340488 A1 | 10/2020 | Kobielski et al. |
| 2020/0363133 A1 | 11/2020 | Gerstler et al. |

* cited by examiner

CORE BODY FOR TRANSFER APPARATUS

CROSS-REFERENCE TO RELATED APPLICATIONS

This application relates to and claims priority benefits from U.S. Provisional Application No. 63/176,961, entitled "Core Body for Transfer Apparatus," filed Apr. 20, 2021, which is hereby incorporated by reference in its entirety.

BACKGROUND

Technical Field

The apparatuses and methods described herein relate to apparatuses that transfer heat between different fluids or filter particles.

Discussion of Art

Cooling apparatuses transfer heat from one fluid to another fluid across or through a barrier. One example of a cooling apparatus is an exhaust gas recirculation (EGR) cooler. This cooler transfers or draws heat away from recirculated engine exhaust gas to a coolant, such as water, as the exhaust gas and coolant flow through the cooler. The coolers have shells in which cores are disposed. The cores have separate channels for the coolant and the exhaust gas. The cores are designed to enable heat transfer from one fluid to another fluid and/or the filtering of a component from one fluid through a barrier without allowing the two fluids to mix. One problem with these coolers is the manufacture and assembly of complex core geometries within a shell of the cooler. The fluid channels of the core may snake through the core in non-linear paths to encourage fluid-wall interactions for heat transfer and/or filtering without excessively increasing fluid flow resistance and/or pressure drop through the core. Such complex geometries that provide tortuous flow channels while maintaining physical separation between the different fluids through the core may be able to be constructed according to conventional processes, such as casting.

Additive manufacturing can be used to three-dimensionally print or form the complex core geometry. However, due to limitations in additive manufacturing technology, printing complex repeating geometries typically requires forming support structures underneath some downskin surfaces to maintain design integrity and structural integrity. The support structures are undesirable for several reasons, as the support structures clog the flow channels, are difficult or impossible to remove without detrimental effect to the core, and slow the additive manufacturing process. One way to avoid the formation of support structures within the core geometry is to reduce the size of the repeating units or cells in the core body. But, reducing the unit cell size would undesirably increase flow resistance through the core, increase the pressure drop through the core, and reduce manufacturing speed and increase manufacturing costs (e.g., to print more units cells per given volume than if the unit cells are larger). This may result in reduced throughput and transfer effectiveness. It may be desirable to have a system and method that differs from those that are currently available.

BRIEF DESCRIPTION

In one or more embodiments, a core body is provided that includes a structure having a plurality of connected unit cells, and at least one unit cell of the plurality of connected unit cells has one or more sidewalls that are curved and have an inner surface that defines at least a portion of an inner passageway within and through the unit cell. The one or more sidewalls of the unit cell define multiple orifices such that a first fluid can ingress the unit cell through one of the orifices and can egress the unit cell through another of the orifices. The one or more sidewalls include a cone disposed between at least some of the orifices of the unit cell. The one or more sidewalls have an outer surface, and a dimple is defined along the outer surface at the cone. The one or more sidewalls have an edge that extends around the orifices of the unit cell. The edges of different unit cells connect to each other, and the outer surface at least partially defines an outer passageway that is sealed from the inner passageway by the one or more sidewalls of the unit cell. The outer passageway is configured to enable flow of a second fluid therethrough. The one or more sidewalls of the unit cell are configured to transport one or more of thermal energy from the first fluid or a component of the first fluid flowing in the inner passageway to the second fluid flowing in the outer passageway without the first fluid mixing with the second fluid.

In one or more embodiments, a core body is provided that includes a structure having a plurality of connected unit cells, and at least one unit cell of the plurality of connected unit cells has one or more sidewalls that are curved and have an inner surface that defines at least a portion of an inner passageway within and through the unit cell. The one or more sidewalls of the unit cell define at least four orifices such that a first fluid can ingress the unit cell through one of the orifices and can egress the unit cell through another of the orifices. A portion of the one or more sidewalls disposed between three of the orifices has a triangular shape, and the three orifices are spaced apart 120 degrees along a circumference of the unit cell. The one or more sidewalls have an edge that extends around the orifices of the unit cell. The edges of different unit cells connect to each other to at least partially define outer passageways that are sealed from the inner passageway of the unit cell and inner passageways of other unit cells by the one or more sidewalls of the unit cells. The outer passageways are configured to enable flow of a second fluid therethrough. The one or more sidewalls of the unit cells are configured to transport one or more of thermal energy from the first fluid or a component of the first fluid flowing in the inner passageways to the second fluid flowing in the outer passageways without the first fluid mixing with the second fluid.

In one or more embodiments, a method (e.g., for forming a core body) is provided. The method includes additively manufacturing a core body by sequentially depositing layers of material at least partially on top each other in a build direction to form a structure comprised of a plurality of connected unit cells. At least one unit cell of the plurality of connected unit cells has one or more sidewalls that are curved and have an inner surface that defines at least a portion of an inner passageway within and through the unit cell. The one or more sidewalls of the unit cell define multiple orifices such that a first fluid can ingress the unit cell through one of the orifices and can egress the unit cell through another of the orifices. The one or more sidewalls include a cone disposed between at least some of the orifices of the unit cell. The one or more sidewalls have an outer surface, and a dimple is defined along the outer surface at the cone. The one or more sidewalls have an edge that extends around the orifices of the unit cell, and the edges of different unit cells connect to each other. The outer surface at least partially defines an outer passageway that is sealed from the inner passageway by the one or more sidewalls of the unit cell. The outer passageway is configured to enable flow of a second fluid therethrough. The one or more sidewalls of the unit cell are configured to transport one or more of thermal energy from the first fluid or a component of the first fluid flowing in the inner passageway to the second fluid flowing in the outer passageway without the first fluid mixing with the second fluid.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
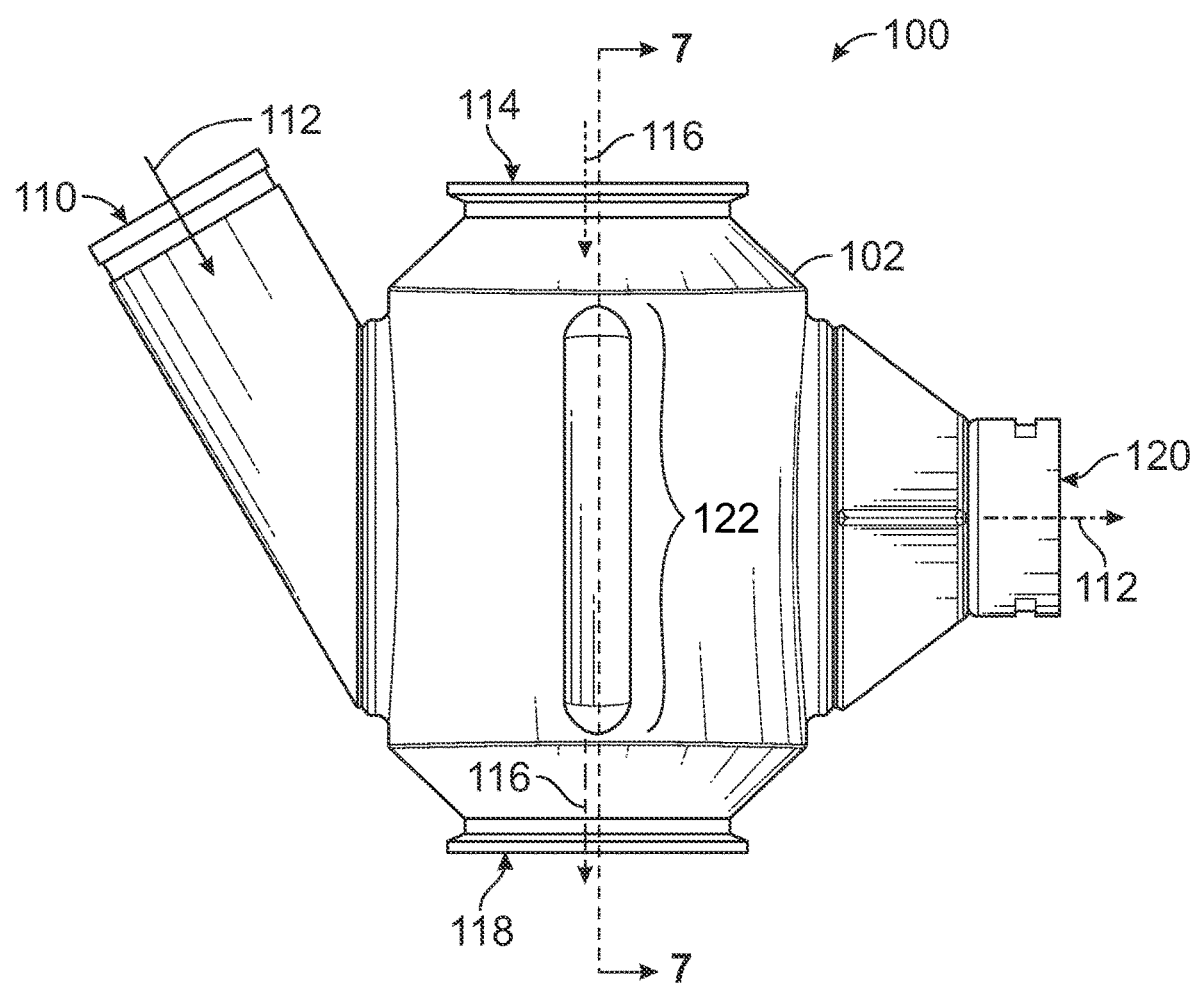
FIG. 1 illustrates one example of a transfer apparatus.

At least one embodiment of the inventions described herein relates to a monolithic (e.g., single body) transfer apparatus that accommodates thermal expansion of a core through a unique flexible diaphragm connection at an inlet and outlet of the apparatus. This flexible diaphragm can be more easily displaced than some known sliding joints and/or seals without causing unacceptable stresses in an outer shell (e.g., housing) or core. The transfer apparatus can cause a cooling medium (e.g., coolant) to be forced through the core without a direct connection of the shell to the core. The cooling medium can be forced by forming (e.g., via additive manufacturing) different sized volumes in different locations between (a) the diaphragm and (b) the shell and core to increase the pressure of the coolant in locations that forces the coolant through more of the core (relative to some known coolers using sliding seals between the core and shell). The flexible diaphragm can be integrally formed with the core and shell via additive manufacturing to provide a completely integrated wall that allows for minimal to no coolant leakage between the core and the shell. Printing the shell and core as a single piece body permits tight control of the interface between the two geometries (the core and the shell).

Alternatively, the core and shell described herein can be separately formed, and then the core placed into the shell. For example, the shell can be cast, additively manufactured, injection molded, or the like, and the core can be additively manufactured and placed into the shell. The flexible diaphragm can be formed as part of the shell or core, or may be a separately formed and then placed between the shell and the core. The shell and core can then be welded together to form a completely integrated solid. Aspects and features of the design and manufacturing methodology may be determined using features disclosed herein.

The use of additive manufacturing of the flexible diaphragm and/or the core can enable the core to be fit into a wide variety of application spaces. The shell similarly can be made to avoid interference with existing components for retrofit applications.

The apparatuses described herein can maximize or increase useful lives of the apparatuses relative to some known EGR coolers by accommodating thermal cycling without a sliding interface. Additionally, because there is no moving or sliding interface to seal with a gasket, O-ring, or the like, the apparatus can withstand extreme temperatures in conditions. One such condition is a dry run condition for an engine, in which engine exhaust gas flows though the apparatus without a cooling medium also flowing through the apparatus. This condition can expose the apparatus to temperatures of over 1,000 degrees Fahrenheit (or 540 degrees Celsius). Extreme temperatures may, in turn, cause extreme thermal expansion. The flexible diaphragms of inventive embodiments described herein may flex and accommodate the thermal expansions.

Other embodiments of the inventions described herein relate to the core, or core body, of a transfer apparatus. The core body may be determined or designed to have repeating, interconnected unit cells that define inner passageways for one fluid through the unit cells and outer passageways for another fluid outside of the unit cells without the two fluids physically mixing with each other. For example, the inner passageways are not fluidly connected to the outer passageways. The unit cells have sidewalls between the inner passageways and the outer passageways that permit the transfer of thermal energy (e.g., heat) across the sidewalls from the hotter fluid to the cooler fluid. The sidewalls optionally may be determined or designed to permit the transfer (e.g., filtering) of one or more components from a first fluid through the sidewalls into the second fluid. The first fluid and/or the second fluid optionally may include more than one fluid type, composition, or compound. For example, the first fluid may be a coolant that is introduced into the inner passageways of the core, and the second fluid may be multiple different fluids that are introduced into the outer passageways. The multiple different fluids can mix with one another within the core and transfer heat to the coolant through the thin sidewalls.

The core body according to an embodiment has a complex, repeating geometry that separates fluids and is printable without forming support structures. The geometry of the core body enables the option for relatively large, unsupported unit cell dimensions. The larger unit cells can provide reduced flow resistance and pressure drop through the core body (e.g., increased fluid throughput) relative to smaller unit cells. The unit cells are hollow, so increasing the size of the unit cells may actually reduce the amount of material deposited during the additive manufacturing process relative to smaller unit cells, thereby increasing the print speed and reduce printing and/or material costs.

The ability to additively manufacture the core body without support structures also enables the core body to be formed in customized shapes based on a specific application. In the EGR cooler, the core body can be printed to conform with the specific inner volume or form factor of the shell. Optionally, the core body may be integrally formed with the shell during a common additive manufacturing process to provide a monolithic (one-piece) EGR cooler. Integrally forming the core body with the shell eliminates seams between the components which can beneficially eliminate potential leak paths during use and operation of the EGR cooler.

FIG. 1 illustrates one example of a transfer apparatus 100. The apparatus can be used to transfer energy or components between two media. For example, the apparatus can transfer thermal energy (e.g., heat) from one fluid to another fluid (to cool one fluid) or can transfer a component from one fluid to another fluid (to filter the component from one fluid). The apparatus includes an outer shell 102 in which an internal heat transfer core body and a flexible diaphragm (both shown in FIG. 2) are disposed. The shell has a first inlet 110 that receives a first fluid 112, a second inlet 114 that receives a second fluid 116. The first and second fluids may be gases and/or liquids. For example, the first fluid may be a coolant or cooling medium, such as a heat transfer fluids (e.g., water, refrigerant, other synthetic or natural fluids). The second fluid can be a gas exhaust from an engine, or may be another liquid. The second fluid can be warmer than the first fluid prior to entry into the apparatus.

The shell also includes a first outlet 120 through which the first fluid is directed out of the shell and a second outlet 118 through which the second fluid is directed out of the shell. As described herein, the core body has inner passageways (shown in FIG. 2) through which the first fluid flows through the core from the first inlet to the first outlet and outer passageways (shown in FIG. 2) through which the second fluid flows through the core from the second inlet to the second outlet. As the first and second fluids flow through the corresponding inner and outer passageways, heat can be transferred from the second fluid to the first fluid (across or through the material forming the core). Alternatively, the material forming at least part of the core can filter one or more components from the second fluid to the first fluid (or from the first fluid to the second fluid). The first fluid optionally may include multiple different fluids that mix together within the inner passageways of the core. The second fluid optionally may include multiple different fluids that mix together within the outer passageways of the core.

The inner passageways can keep the first fluid separate from the second fluid, and the outer passageways can keep the second fluid separate from the first fluid. The inner passageways can direct flow of the first fluid from the first inlet to the first outlet. The first outlet can direct the first fluid (which has now been heated by the second fluid or has received one or more components from the second fluid) to a device or system that cools (or filters) the first fluid and returns the first fluid to the first inlet. The outer passageways can direct flow of the second fluid from the second inlet to the second outlet. The second outlet can direct the second fluid (which has now been cooled by the first fluid or has had the one or more components removed and passed to the first fluid) back to the engine (in an EGR engine) or to another location.

Figure 2:
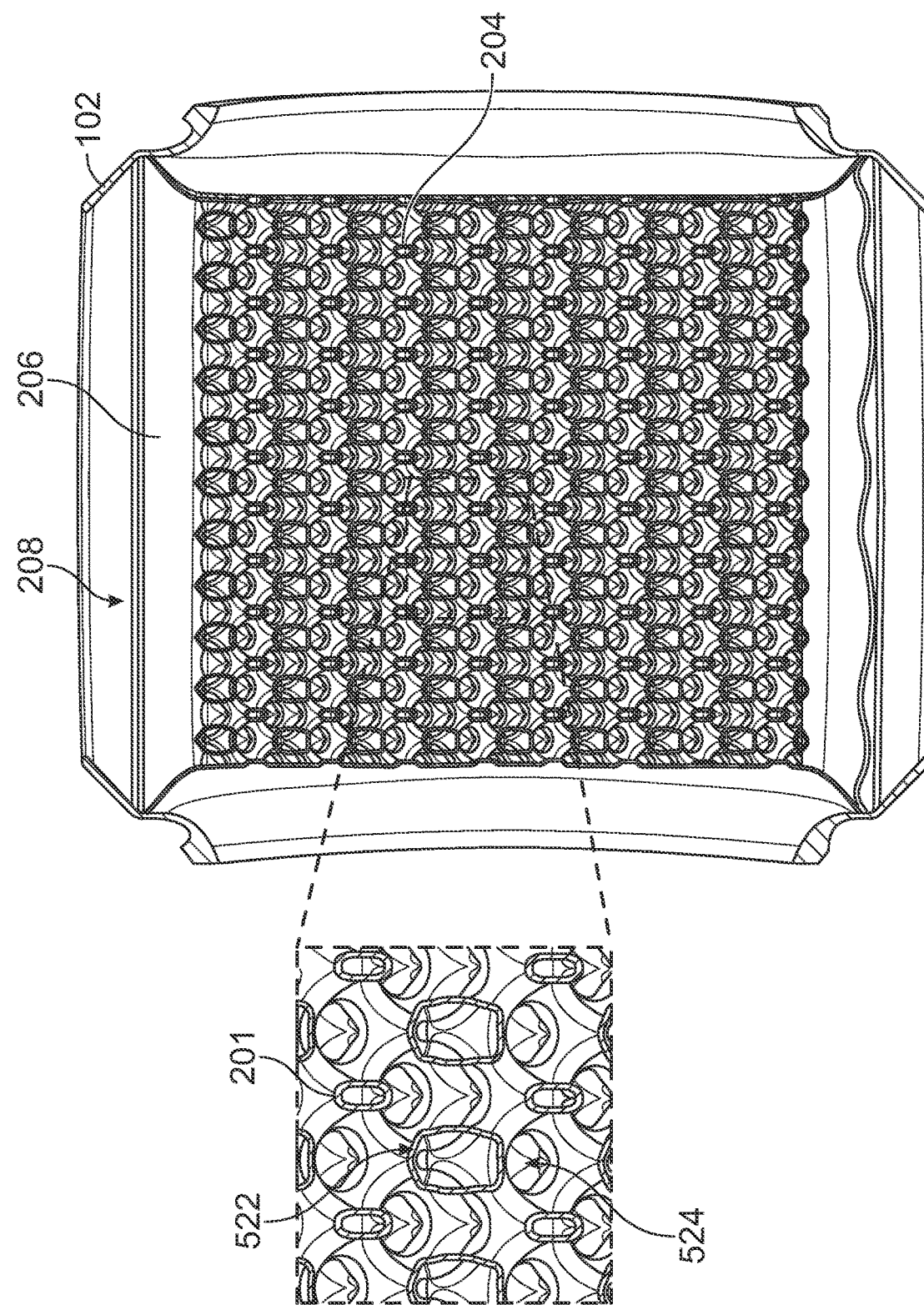
FIG. 2 illustrates a first cross-sectional view of the apparatus shown in FIG. 1.

FIG. 2 illustrates a first cross-sectional view of the apparatus shown in FIG. 1. The cross-section shown in FIG. 2 is along a plane that is parallel to the plane of FIG. 1 and extends through an axial center of the core body. The internal heat transfer core body 204 inside the shell includes a single structure or web of material 201 in a shape that forms the first interior passageways 522 and the second interior passageways 524. The first interior passageways 522 and the second interior passageways 524 of the core body are also referred to herein as inner passageways and outer passageways, respectively. Alternatively, the core may be formed from multiple bodies or webs of material that are in a shape that forms the inner and outer passageways.

The apparatus includes a flexible diaphragm 206 that couples and extends from the core body to an interior surface 208 of the outer shell. The diaphragm is flexible in that the diaphragm may bend or otherwise modify shape when receiving force or displacement more than the shell and/or core body (receiving the same force or displacement). The diaphragm forms a flexible transition between (a) each of the first inlet and the second inlet of the shell and (b) the core body. The flexible diaphragm forms a seal that prevents the first fluid flowing through the inner passageways of the core body from flowing into the outer passageways of the core body. The flexible diaphragm can accommodate for different changes in size of the shell and the core body due to changes in heat. For example, the shell and the core body may expand by different amounts or distances due to the different sizes of the shell and core body (even when the shell and core body are formed as a monolithic body and formed from the same material). The flexible diaphragm can flex due to the different expansions of the shell and core body without tearing or otherwise breaking the seal between the shell and core body. This maintains separation of the inner and outer passageways of the core body.

Figure 3:
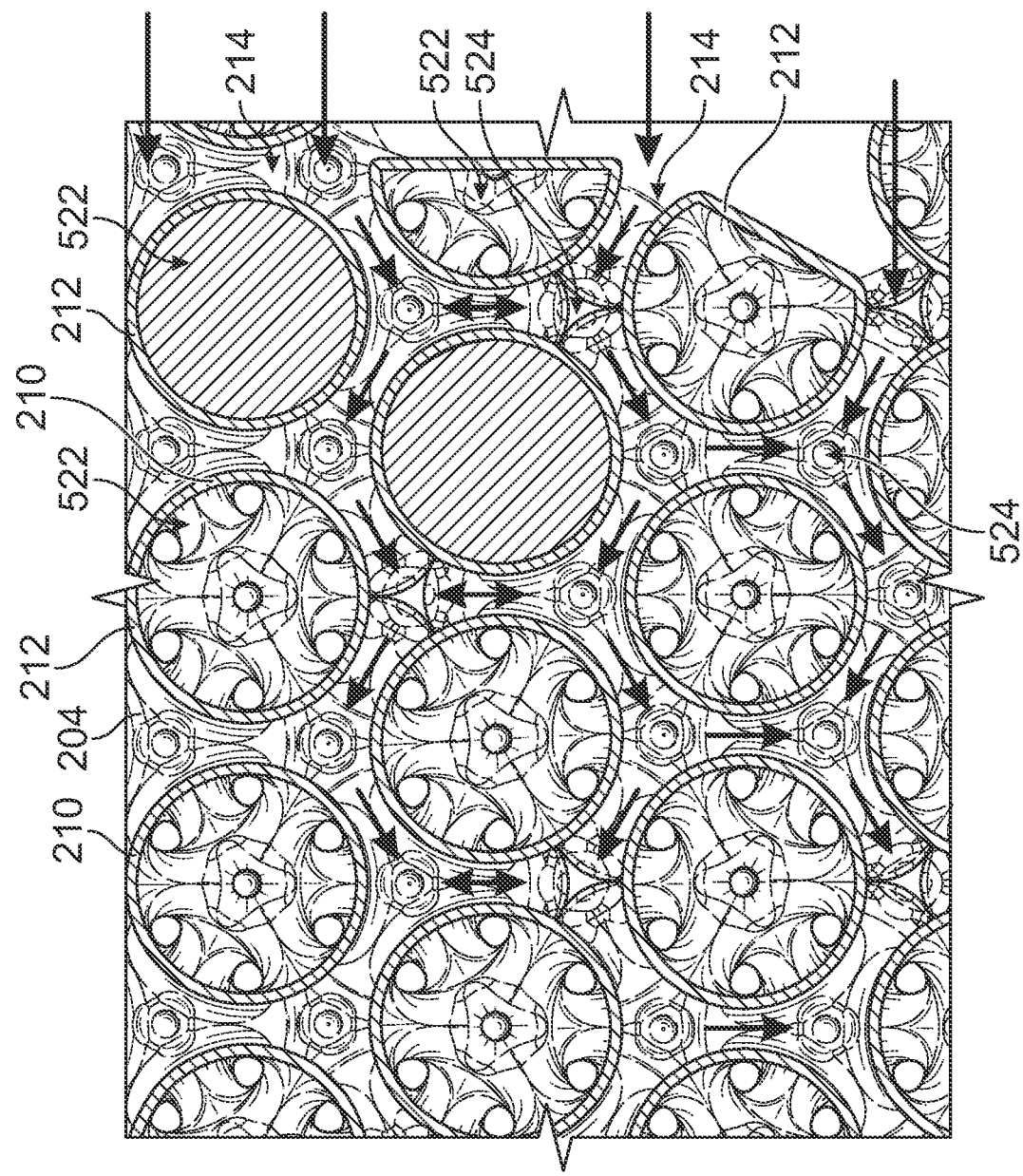
FIG. 3 illustrates a cross-sectional view of a portion of a core body of the transfer apparatus according to an embodiment.

FIG. 3 illustrates a cross-sectional view of a portion of the core body according to an embodiment. The cross-section shown in FIG. 3 is along a plane that is parallel to and offset from the plane of FIG. 2. The inner passageways 522 are on one side of the body or web of material of the core, and the outer passageways 524 are on the opposite side of the body or web of material of the core. For example, the body or web of material includes thin sidewalls 210 that partition the inner passageways from the outer passageways.

The sidewalls are part of unit cells 212 of the core body, which are geometric shapes that repeat throughout the core body. The unit cells are interconnected. For example, the core body is a structure that has a plurality of connected unit cells. In one or more embodiments, the unit cells have generally spherical shapes defined by the sidewalls, as indicated by the circular cross-sections shown in FIG. 3. The shapes of peripheral unit cells located along the cylindrical side of the core body may be distorted to deviate from the spherical shape as necessary to provide a desired overall size and/or shape of the core body. The unit cells may have other shapes in other embodiments. Suitable other shapes can include cubic, parallelepiped, prism, or the like. The inner passageways are defined within and extend through the unit cells. The outer passageways are outside of the unit cells and represent the unoccupied spaces between the unit cells.

As shown in FIG. 3, the inner passageways are separated from the outer passageways by the sidewalls. The inner passageways within two of the unit cells are filled in by diagonal lines in FIG. 3 to clearly show the distinction between the inner passageways and the outer passageways that surround the inner passageways in the illustrated cross-sectional view. The sidewalls may be relatively thin. Suitable sidewall thicknesses may be less than 3 millimeters (mm). The sidewalls of the unit cells connect to one another at edges 806 (shown in FIG. 10) to fluidly connect the inner passageways throughout the core body and keep the first and second fluids physically separated from one another. Heat may be transferred between the first fluid and the second fluid through the sidewalls without mixing any other part of the first fluid and the second fluid together in the inner or outer passageways in one embodiment. Alternatively, the sidewalls may include pores that filter one or more components from the second fluid to the first fluid (or from the first fluid to the second fluid) without mixing any other part of the first fluid and the second fluid together in the inner or outer passageways. In the illustrated embodiment, the fluid within the inner passageways is a gas, and the fluid within the outer passageways is a coolant. Optionally, the gas in the inner passageways may be hot gas exhausted from an engine, and the coolant within the outer passageways may be water. The water can absorb heat from the gas through the sidewalls of the unit cells as the water flows through tortuous paths between the unit cells along the outer passageways. The water enters the core body through inlet openings 214 of the outer passageways along the peripheral surface of the core body.

Figure 4:
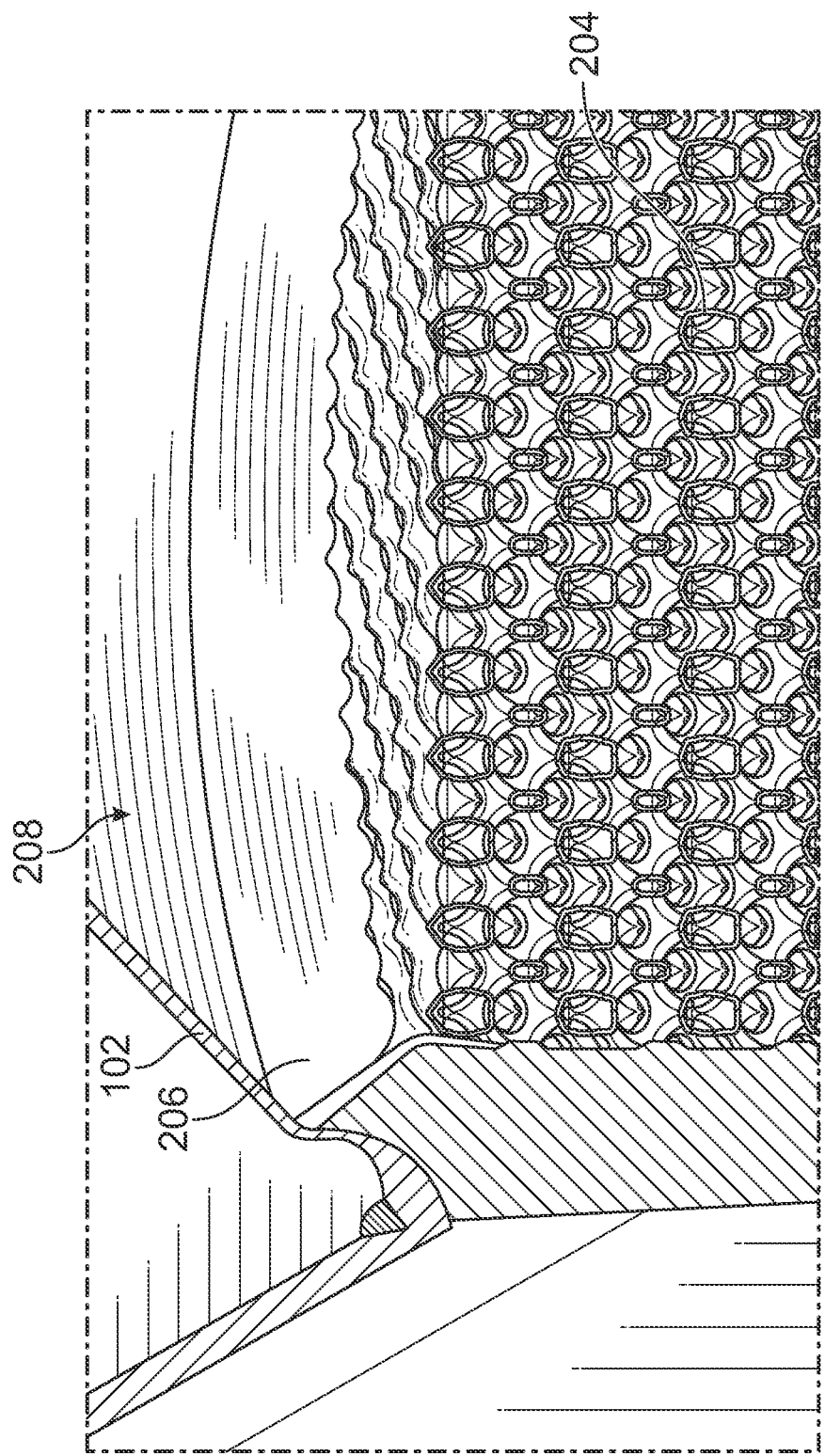
FIG. 4 illustrates an additional cross-sectional view of the apparatus shown in FIG. 1.
Figure 5:
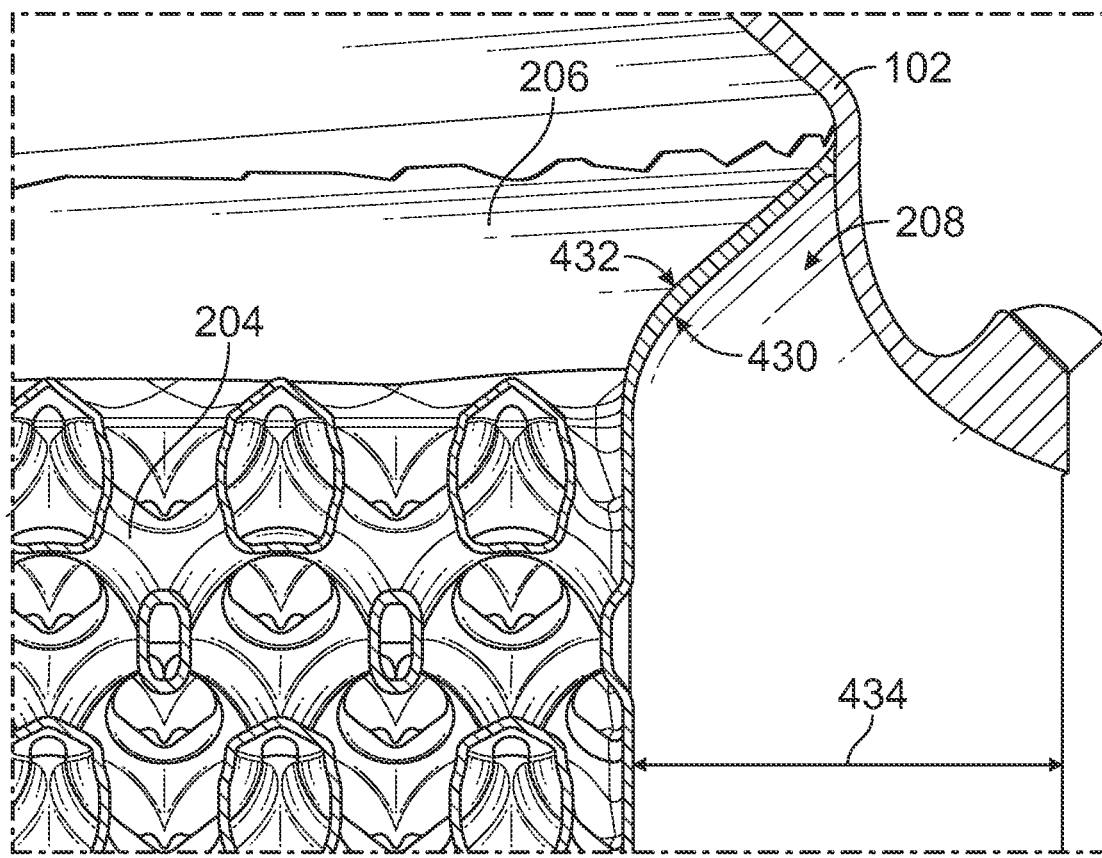
FIG. 5 illustrates another cross-sectional view of the apparatus shown in FIG. 1.
Figure 6:
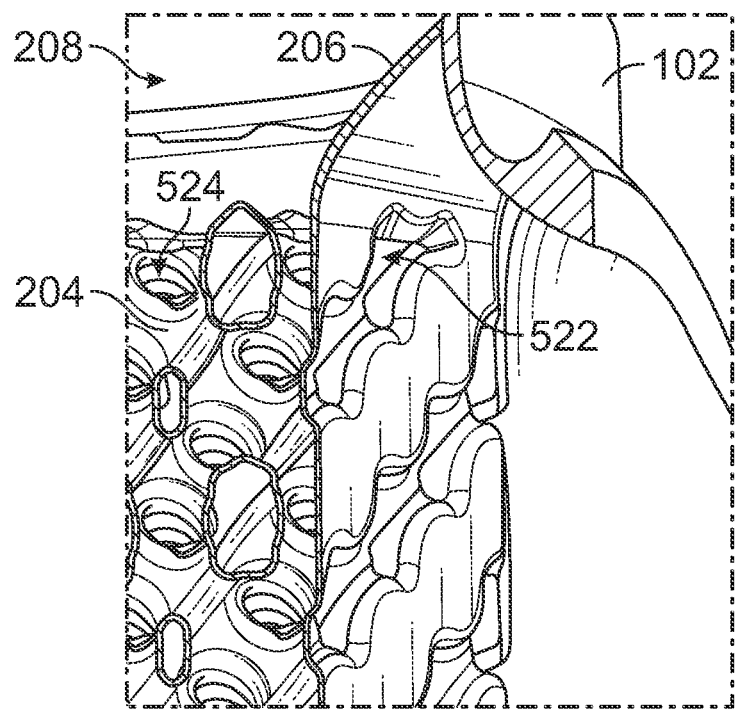
FIG. 6 illustrates another cross-sectional view of the apparatus shown in FIG. 1.

FIGS. 4, 5, and 6 include additional cross-sectional views of the apparatus shown in FIG. 1. The cross-sectional views of FIGS. 4, 5, and 6 are taken along the same plane as the cross-sectional view of FIG. 2. The flexible diaphragm has a curved conical shape that extends inward from the interior surface of the shell to the core body. This conical shape provides a conical transition between the shell and the core body. The conical transition can be controlled to vary in length (e.g., the distance from the interior surface of the shell to the core body) and/or angle of intersection to the shell and core so that the flexible diaphragm can be included in a variety of shapes of the core body and/or shell. The ability to customize the size and/or shape of the flexible diaphragm allow for the transfer apparatus to be effectively determined or designed and packaged for space constrained applications. While the shell is shown as having a cylindrical shape, the core body and/or shell can have another shape, with the flexible diaphragm extending between and sealing the shell to the core body. For example, the shell may have a rectangular shape, with the flexible diaphragm extending between and sealing the shell to the core body.

The flexible diaphragm is flat in the illustrated embodiment. For example, the diaphragm may have a smooth, conical shape without undulations, waves, dimples, protrusions, or the like. Alternatively, the diaphragm may have an uneven surface with undulations, waves, dimples, protrusions, or the like.

As shown, the flexible diaphragm may be thinner than the outer shell. An inner surface 432 of the flexible diaphragm faces the core body and faces away from the portion of the inner surface of the shell that is between the second inlet and the second outlet of the shell. This inner surface of the flexible diaphragm may be oriented at an angle that is less than forty-five degrees to the interior surface of the outer shell. Alternatively, the inner surface may be oriented at an angle that is less than thirty degrees or less than fifteen degrees to the interior surface of the outer shell. An opposite, outer surface 430 of the flexible diaphragm faces away from the core body and can face the portion of the inner surface of the shell that is between the second inlet and the second outlet. This outer surface of the flexible diaphragm can be oriented at an angle that is more than forty-five degrees to the interior surface of the outer shell. Alternatively, the outer surface may be oriented at an angle that is greater than fifty-five degrees or greater than seventy-five degrees to the interior surface of the outer shell.

Figure 7:
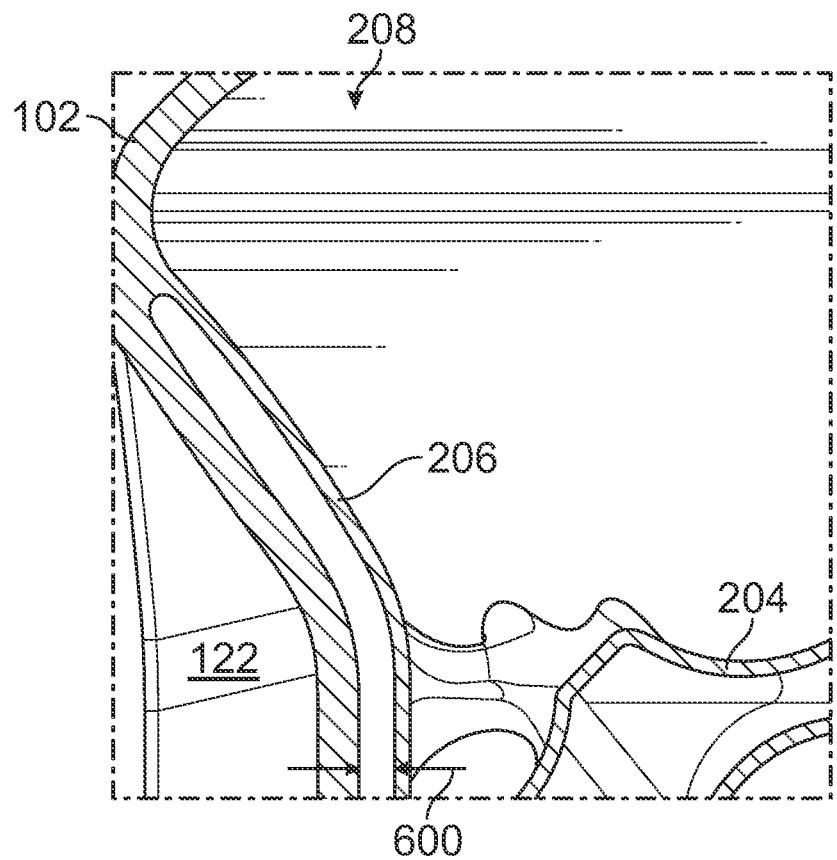
FIG. 7 illustrates a first cross-sectional view of the transfer apparatus along line 7-7 in FIG. 1.
Figure 8:
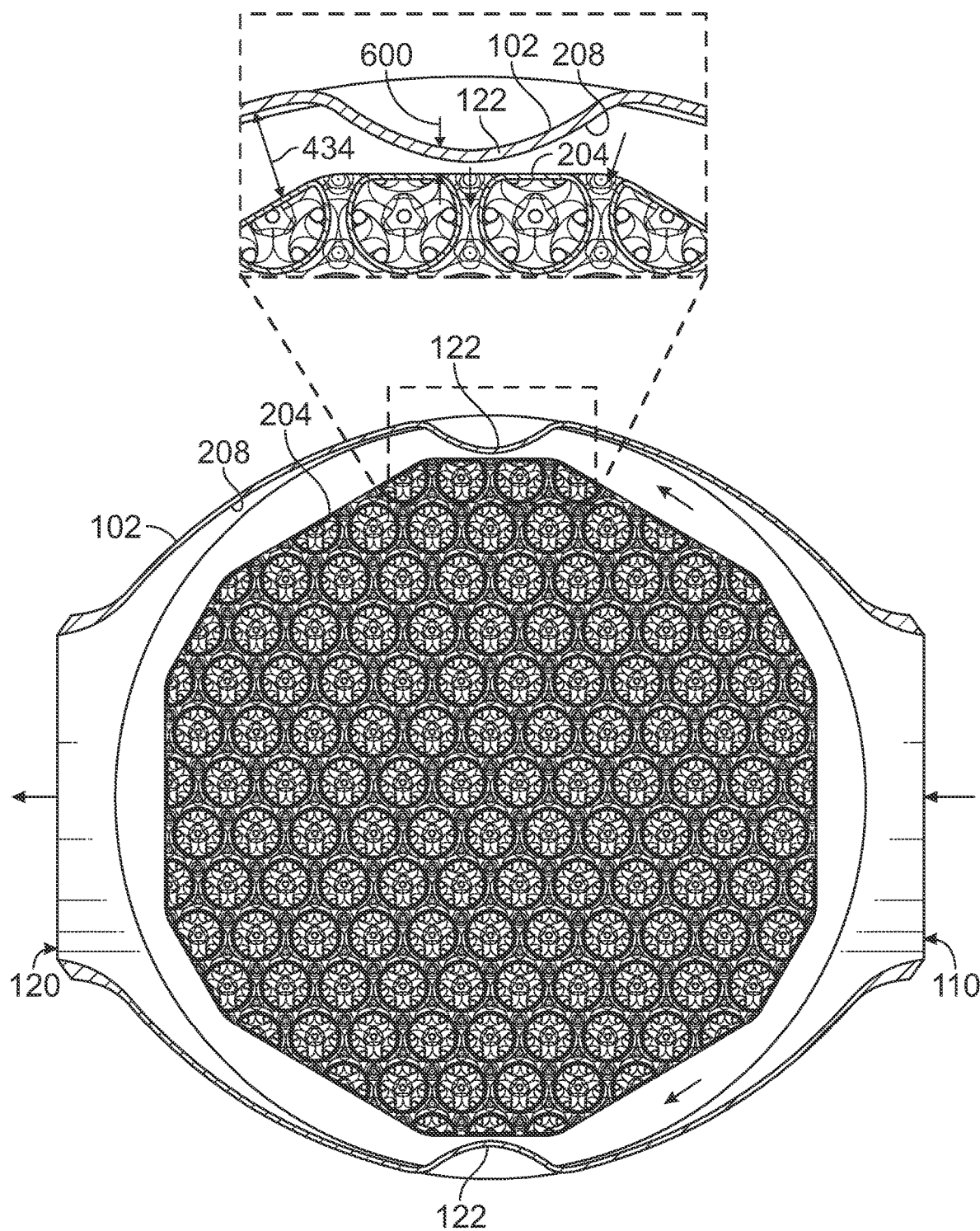
FIG. 8 illustrates a second cross-sectional view of the transfer apparatus taken along a plane that is orthogonal to the line 7-7 in FIG. 1.

FIG. 7 illustrates a first cross-sectional view of the transfer apparatus along line 7-7 in FIG. 1. FIG. 8 illustrates a second cross-sectional view of the transfer apparatus. The cross-sectional view in FIG. 8 is taken along a plane that is orthogonal to the line 7-7 in FIG. 1. As shown in FIG. 1, the shell includes elongated indentations 122 on opposite sides of the shell. The indentations can be elongated in directions that extend from the second inlet to the second outlet. The indentations can be disposed midway between the first inlet and the first outlet along a circumference of the shell, as shown in FIG. 8. For example, the indentations may be on opposite sides of the shell. Alternatively, the indentations may be in another location and/or more than two indentations may be included in the shell. The indentations can reduce the distance or spatial gap between the inner surface of the shell and the core body. For example, the core body can be disposed a farther distance 434 from the inner surface of the shell in locations away from the indentations (as shown in FIGS. 5 and 8) and a closer distance 600 at the indentations (as shown in FIGS. 7 and 8).

The decreased distance between the shell and the core in the indentations can help force the first fluid from the first inlet toward and out of the first outlet. These indentations reduce the volume in which the first fluid flows between the first inlet to squeeze the first fluid and help force the first fluid toward the first outlet.

Figure 9:
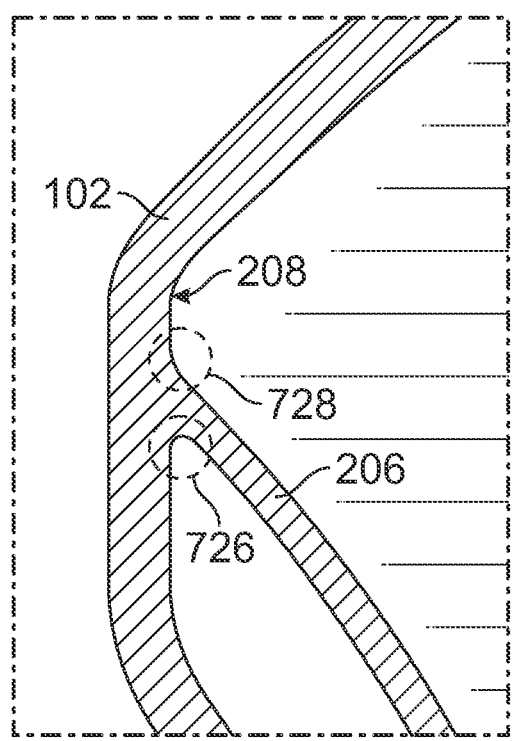
FIG. 9 illustrates another cross-sectional view of the transfer apparatus along line 7-7 shown in FIG. 1.

FIG. 9 illustrates another cross-sectional view of the transfer apparatus along line 7-7 shown in FIG. 1. In this illustrated embodiment, the flexible diaphragm interfaces with the interior surface of the shell with rounded interfaces. For example, instead of having corners or interfaces between straight lines at the interface between the inner surface of the flexible diaphragm and the inner surface of the shell and at the interface between the outer surface of the flexible diaphragm and the inner surface of the shell, the flexible diaphragm and/or shell can be formed with fillets at one or both of these interfaces. The flexible diaphragm and/or shell can have an inner fillet 726 and an outer fillet 728 on opposite sides of an interface between the flexible diaphragm and the shell. These fillets can be rounded interfaces that increase the flexibility of the diaphragm (when compared with interfaces that do not include rounded edges or fillets). The inner fillet may have a smaller radius of curvature than the outer fillet, as shown in FIG. 9.

Figure 10:
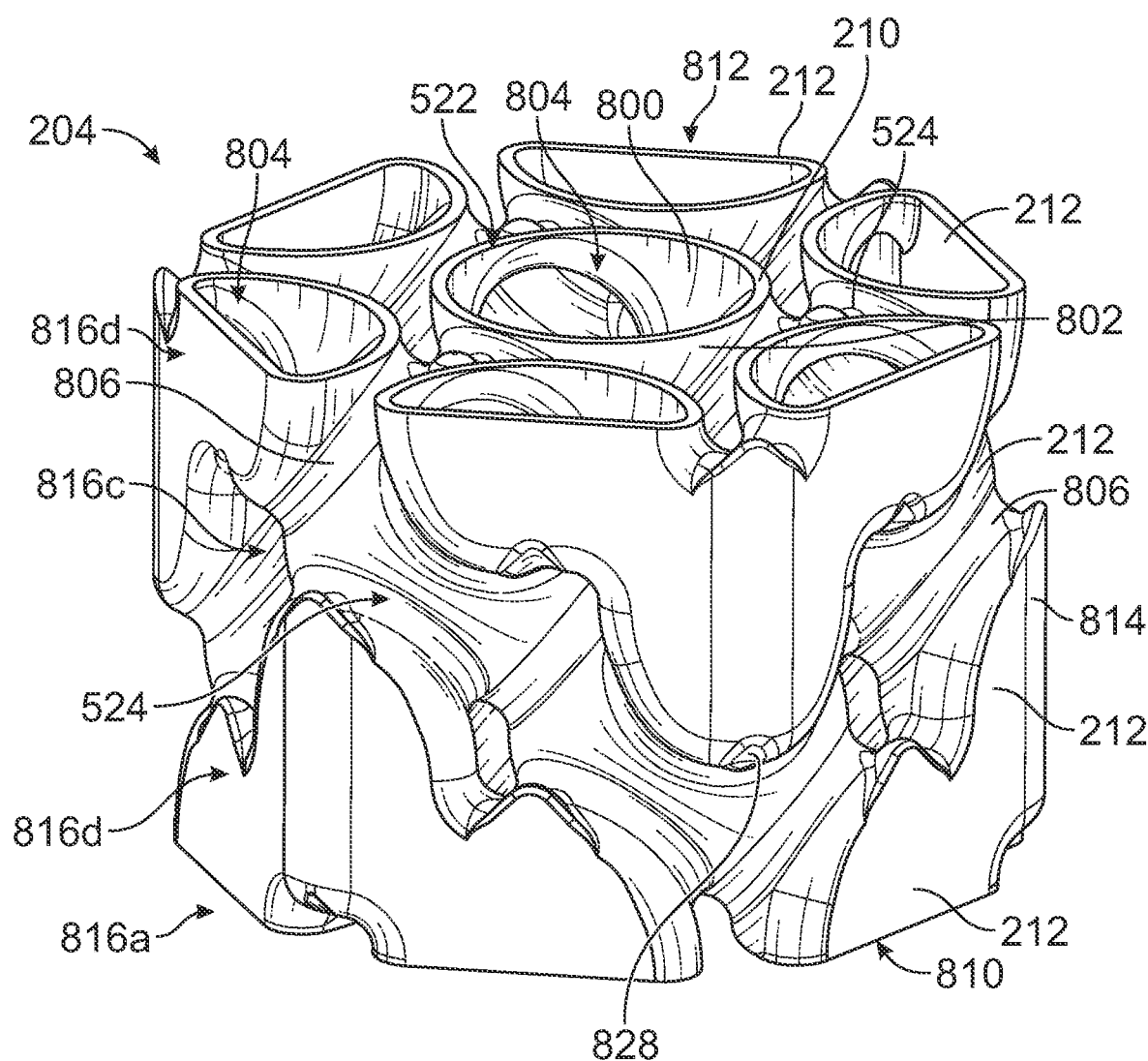
FIG. 10 is a perspective view of the core body of the transfer apparatus according to an embodiment.

FIG. 10 is a perspective view of the core body of the transfer apparatus according to an embodiment. The unit cells of the core body each have one or more curved sidewalls. An inner surface 800 of the one or more sidewalls defines at least a portion of the inner passageway that extends within and through the respective unit cell. An outer surface 802 of the one or more sidewalls defines at least a portion of the outer passageways in the intervening spaces between the unit cells. The core body has a height extending from a bottom end 810 to a top end 812 (opposite the bottom end). The core body has a generally cylindrical shape in the illustrated embodiment to conform to the interior of the shell. For example, the core body has an outer side 814 that is circumferential and extends from the top end to the bottom end. The surface along the outer side has grooves and undulations attributable to the curved sidewalls of the unit cells. The inner passageways through the unit cells permit the first fluid to generally flow along the vertical height of the core body, such as from the top end down and out through the bottom end. The outer passageways can permit the second fluid to flow laterally, radially, and circumferentially (as well as vertically). For example, the second fluid can enter the outer passageways through the cylindrical outer side of the core body as shown in FIGS. 3 and 8.

The unit cells in the core body are arranged in an array. In an embodiment, the cells are disposed in multiple rows 816 that are stacked along the height of the core body. The illustrated embodiment shows are least portions of four rows 816a, 816b, 816c, 816d of unit cells. Each row includes multiple unit cells that are spaced apart from each other. The unit cells in one row may be staggered or offset from the unit cells in the row above or below. For example, a single unit cell may be disposed at least partially above multiple unit cells in the row. Staggering the positions of the unit cells encourages fluid-sidewall contact interactions by forcing the first fluid to snake through the inner passageways rather than essentially freefall through the core body. The heat transfer and/or material transfer occurs via the fluid-sidewall interactions. In an embodiment, a given unit cell in an intermediate row (e.g., 816b, 816c) is interconnected to unit cells in the rows above and below. The unit cell optionally may not be directly fluidly connected to other unit cells in the same row.

The unit cells of the core body may be the same size and shape as one another, except for the peripheral cells along the outer side that are distorted to maintain the designated size and shape of the core body. The sidewalls of the unit cells along the outer side of the core body may be flatter (e.g., less curvature) relative to the sidewall curvature along the interior unit cells. The sidewalls at the outer side close the inner passageways to maintain the mechanical separation between the first and second fluids.

The core body shown in FIG. 10 has fewer unit cells in the array than the core body shown in FIG. 8 for example, to demonstrate that the number and size of the unit cells may be selected based on application-specific parameters. Suitable parameters that may be taken into account can include amount of thermal energy transfer, fluid flow resistance, fluid pressure drop, and the like. The core body according to at least one embodiment is formed to have relatively large unit cell sizes to reduce flow resistance and pressure drop and increase manufacturing efficiency (e.g., less material and printing) while providing sufficient fluid-sidewall interactions to enable desired transfer performance.

The sidewalls of the unit cells define multiple orifices 804 which represent portions of the inner passageways through the unit cells. For example, the first fluid can enter a respective unit cell through one of the orifices of the cell and can egress the unit cell through another of the orifices. In an embodiment, the orifices of a unit cell are connected to other unit cells to fluidly connect the inner passageways through the core body. Each orifice of a unit cell may be fluidly connected to a different unit cell. For example, three orifices of a first unit cell may be connected to a second unit cell, a third unit cell, and a fourth unit cell, respectively. The sidewalls may have an edge 806 that extends around the orifices of the cell. The edges of different unit cells connect to each other to interconnect the inner passageways and seal the inner passageways from the outer passageways.

In an embodiment, the edges of connected unit cells are integrally connected to each other to define seamless interfaces between the unit cells. For example, the core body may be a single, monolithic structure with the unit cells interconnected at seamless interfaces. The material composition of the core body may be selected based on application-specific factors. For example, materials with good thermal conductivity, such as one or more metal materials, may be used for heat exchange applications of the transfer apparatus. Other types of materials, such as polymer materials, ceramic materials, or composite materials, may be utilized to form the core body for filtering applications in which at least a component of the first fluid or the second fluid transfers into and/or through the sidewalls of the unit cells.

According to at least one embodiment, the core body is produced via additive manufacturing. The core body is formed by sequentially depositing layers of build material at least partially on top of each other in a build direction to eventually form the structure shown in FIG. 10. The build material may be a powder that is deposited in a bed and then selectively heated to provide a designated location, size, and shape of each layer according to a design file. Alternatively, the build material may be a filament that is heated and selectively deposited by a movable effector head to provide the designated location, size, and shape of each layer according to the design file. In the illustrated embodiment, the core body may be additively manufactured in an upward build direction 808. For example, the bottom end 810 may be formed initially, and subsequent layers are stacked on top of each other until the top end 812 is eventually formed to complete the build process. Manufacturing steps may be iteratively improved using features disclosed herein.

Figure 11:
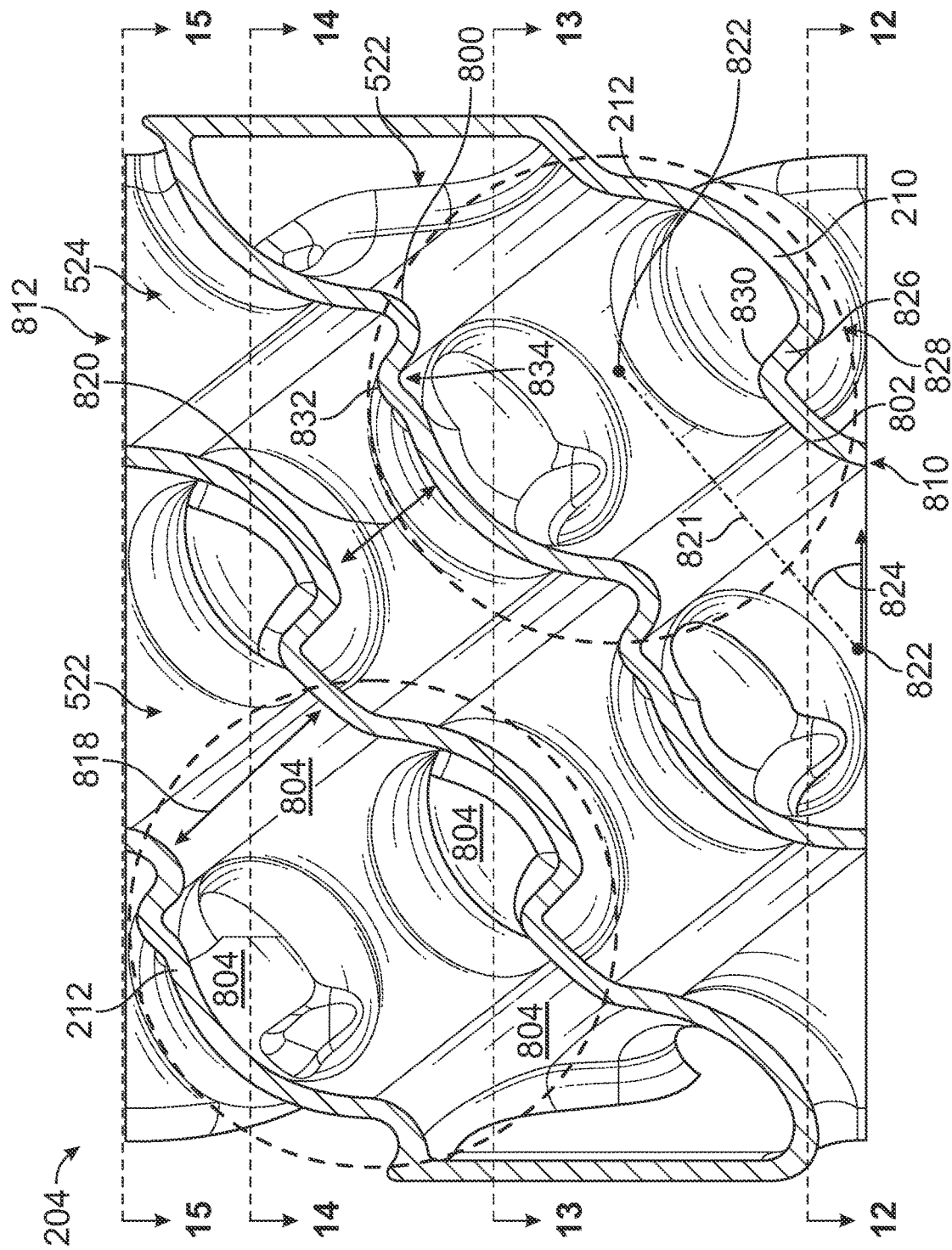
FIG. 11 is a cross-sectional view of the core body shown in FIG. 10.

FIG. 11 is a cross-sectional view of the core body shown in FIG. 10. The cross-sectional view in FIG. 11 is taken along a plane that is orthogonal to the plane of the top end of the core body in FIG. 10, and the cross-section plane may bisect the core body. FIG. 11 shows the bisected view of two full unit cells, indicated by dashed circles, and multiple partial unit cells. FIG. 11 shows four orifices 804 defined by the sidewalls of each of the full unit cells. For example, two orifices are cross-sectioned at top-right and bottom-left areas of the cell, and two orifices are shown at top-left and bottom-right areas that extend a depth into the core body. In an embodiment, unit cells have six total orifices, and the other two are omitted from FIG. 11 due to the cross-section. The six orifices provide flow channels to connect each unit cell with six other unit cells. The unit cells may have a different number of orifices in an alternative embodiment.

As shown in FIGS. 10 and 11, the full unit cells have a spherical shape. For example, portions of the sidewall of each unit cell between the orifices have convex curvature relative to a center of the unit cell to define a sphere. Optionally, the unit cells may be at least slightly elongated to define an ellipse or oval.

The unit cells in adjacent rows may be staggered. The inner passageways may extend at oblique angles relative to the row planes and the vertical height of the core body, which encourages fluid and sidewall interaction. A line 821 extending from a center point 822 of a first unit cell to the center point 822 of a second unit cell that is connected to the first unit cell defines an angle 824 that is no less than 30 degrees and no greater than 60 degrees relative to the row planes (e.g., a horizontal plane). The angle according to a more preferred range may be between 35 degrees and 45 degrees. The angle more specifically may be between 40 degrees and 42 degrees. These angles may be selected to ensure sufficient printability and print quality of the additively manufactured core body, and also to provide efficient cell row packaging.

The dimensions of the inner passageways and the outer passageways vary along the lengths thereof. Along the inner passageways, the orifices define the narrow-most or limiting flow dimensions 818. The orifices of the unit cells may be larger than the narrow-most or limiting flow dimensions 820 in the outer passageways. The inner passageways may occupy more the space within the core body than the outer passageways. The sizing of the flow dimensions and the passageways may be varied based on the type of fluids that flow through the passageways and/or the desired transfer that occurs between the fluids through the sidewalls. In an embodiment, the first fluid through the inner passageways is a hot gas, and the second fluid through the outer passageways is a coolant designed to absorb heat from the gas. In an alternative embodiment, the sizes of the unit cells and/or the spacing between the unit cells may be altered such that the limiting flow dimensions in the outer passageways are larger than the limiting flow dimensions in the inner passageways and/or the outer passageways occupy more space in the core body than the inner passageways.

The unit cells include a conical feature, or cone, 826 disposed between at least some of the orifices of the respective unit cell. The cone 826 projects towards the center point of the unit cell. The cone has an apex 830 that is located between the center point of the cell and the portion of the sidewall at the base of the cone. The cone 826 may be hollow, and the portion of the cone along the outer surface of the sidewall may define a dimple 828. A few dimples of the cones are shown in the perspective view of FIG. 10.

The cone is located at a base of the curved unit cell. For example, the cone may be disposed at the lower-most portion of the unit cell relative to the direction of gravity. In an embodiment, the cone is located along a centerline of the unit cell. When the unit cell is spherical or otherwise curved, the cone at the base or bottom of the unit cell enhances printability of the core body without requiring support structures. For example, as shown in FIG. 11, the bases of the cells are unsupported. Forming an inflection along the sidewall at the base avoids issues associated with printing relatively flat surfaces and/or the nadir of a curve without any supports. The cones enable the unit cells to retain the generally spherical shapes without printing structures to support islands of build material during the manufacturing process. The cones also may prohibit fluid from accumulating within the sidewalls of the unit cells. For example, the first fluid, if a liquid, would run off the cone towards the orifices that surround the cone.

In an embodiment, the sidewalls of the unit cells also include a second conical feature, or cone, 832 along a top portion of the unit cells. The second cone is spaced apart from the first cone and disposed between a different set of the orifices of the unit cell relative to the first cone. The first cone is referred to herein as a lower cone 830, and the second cone is referred to herein as an upper cone 832. The upper cone is hollow and defines a dimple 834. The upper cone projects in the same direction as the lower cone relative the core body. For example, both cones project toward the top end of the core body. The dimple of the upper cone is defined along the inner surface of the sidewall. The upper cone optionally may be colinear with the lower cone. The upper cone may be included to improve the printability of the unit cells in the core body, similar to the inclusion of the lower cone. The presence of the upper cone may eliminate a relatively flat area at the top of the curved unit cells, which may be difficult to reliably print without underlying supports.

Figure 12:
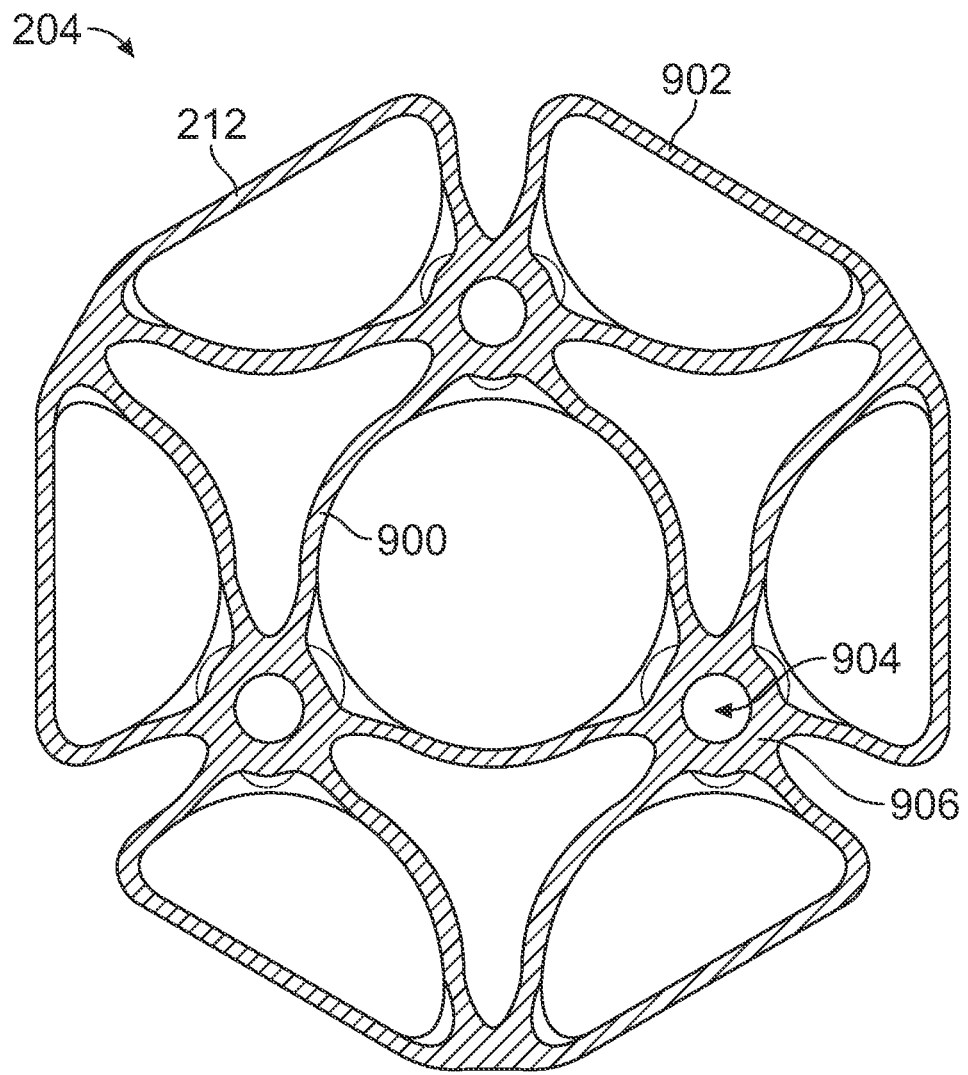
FIG. 12 illustrates a first cross-sectional view of the core body along line 12-12 shown in FIG. 11.
Figure 13:
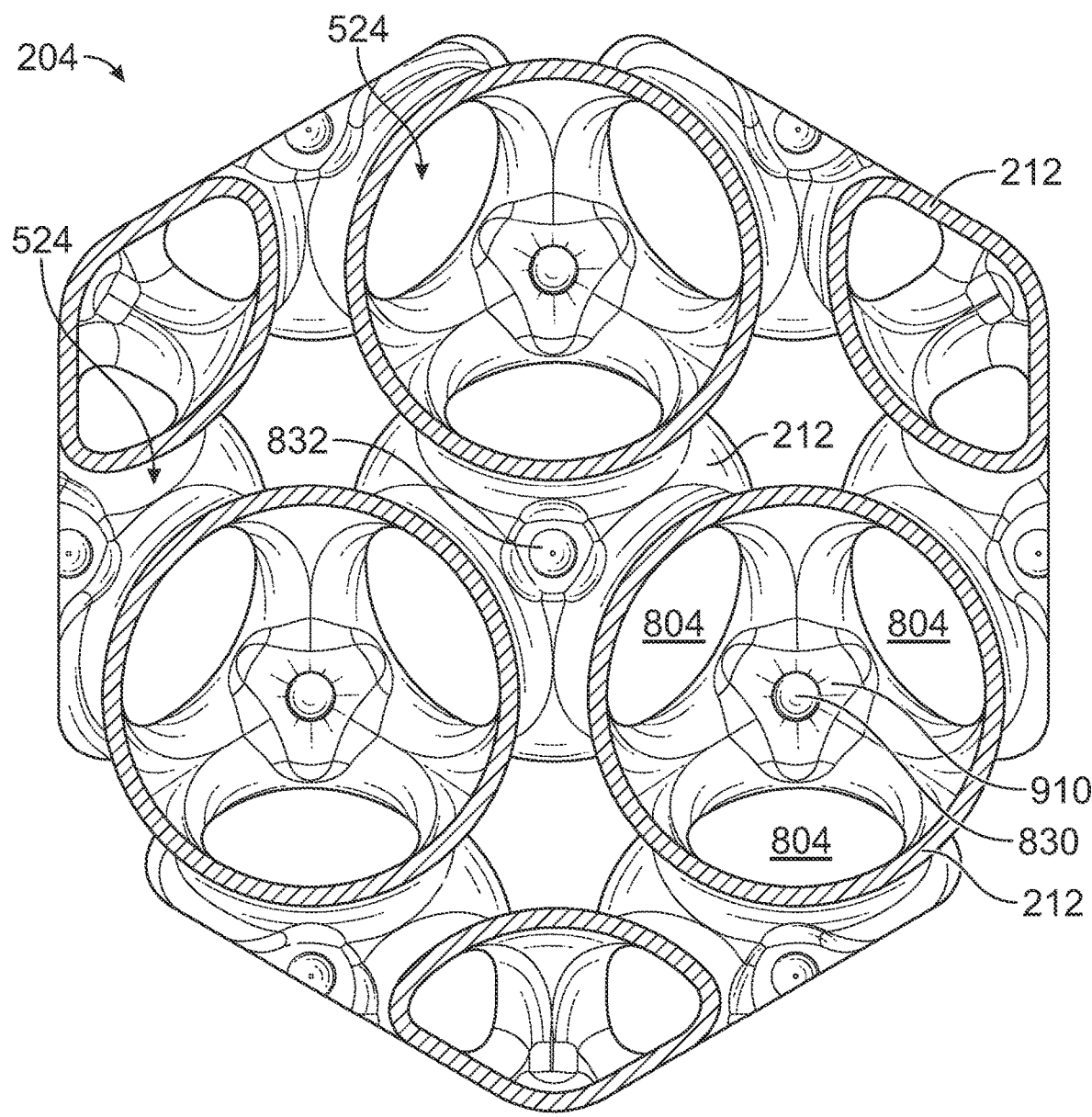
FIG. 13 illustrates a second cross-sectional view of the core body along line 13-13 shown in FIG. 11.
Figure 14:
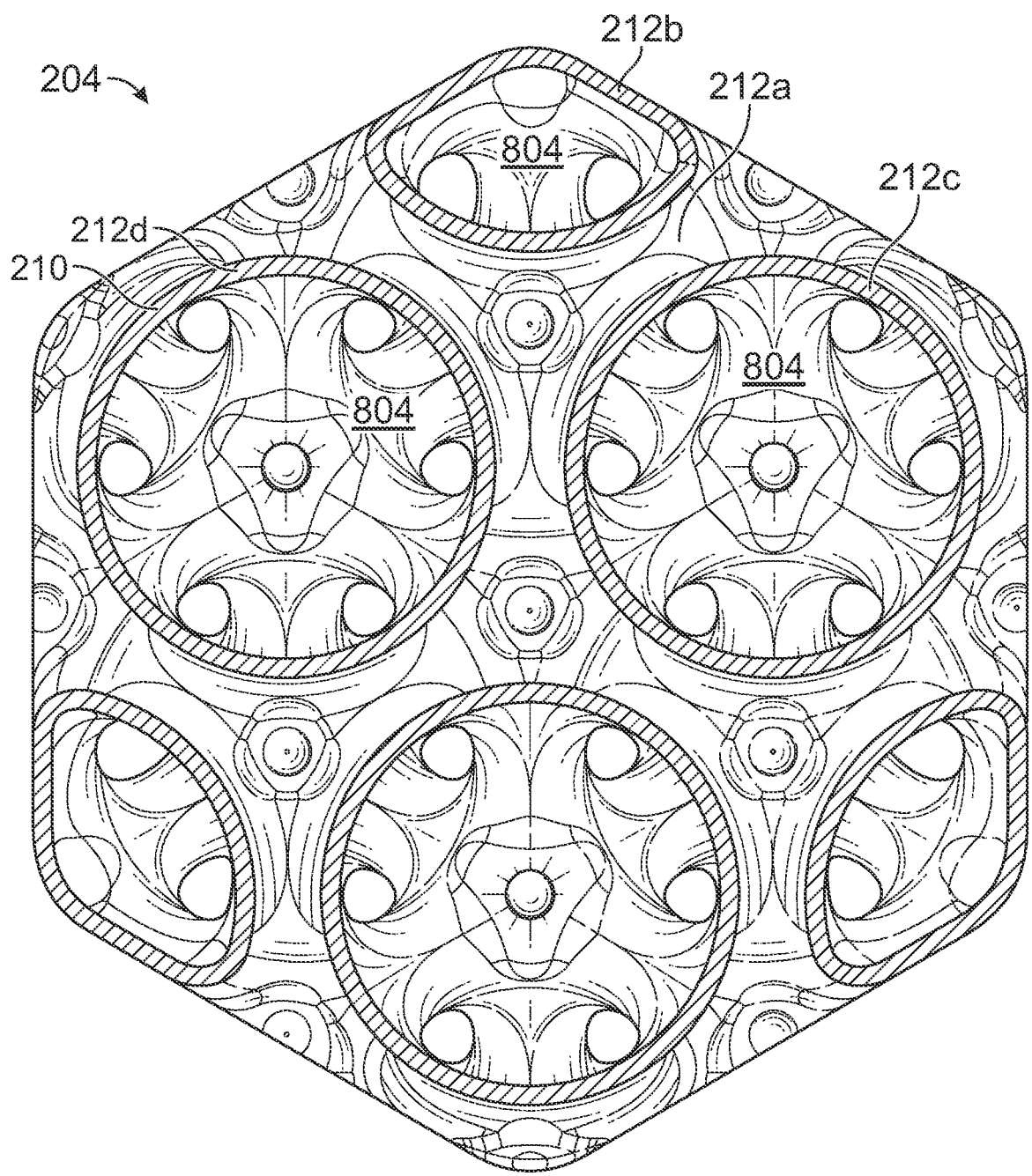
FIG. 14 illustrates a third cross-sectional view of the core body along line 14-14 shown in FIG. 11.
Figure 15:
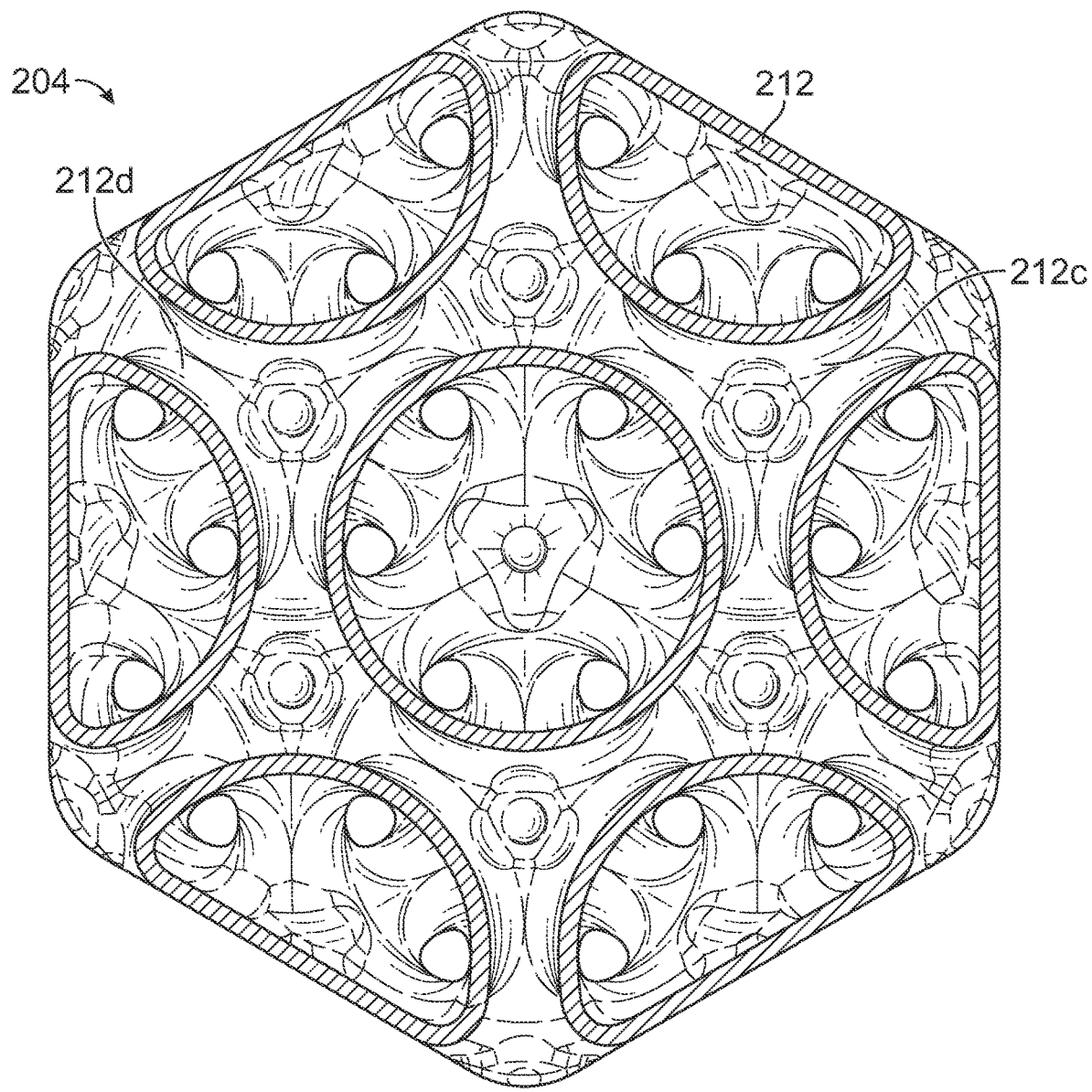
FIG. 15 illustrates a fourth cross-sectional view of the core body along line 15-15 shown in FIG. 11.

FIG. 12 illustrates a first cross-sectional view of the core body along line 12-12 shown in FIG. 11. FIG. 13 illustrates a second cross-sectional view of the core body along line 13-13 shown in FIG. 11. FIG. 14 illustrates a third cross-sectional view of the core body along line 14-14 shown in FIG. 11. FIG. 15 illustrates a fourth cross-sectional view of the core body along line 15-15 shown in FIG. 11. The illustrations in FIGS. 12 through 15 represent top down views of the core body shown in FIG. 10, sectioned along different parallel planes. When the core body is additively manufactured from the bottom to the top, the sections shown in FIGS. 12 through 15 can indicate different chronological stages of the build process. The core body is formed using relatively thin sidewalls for printing efficiency by limiting the amount of material to print, and for providing relatively large passageways inside and outside of the cells to limit fluid flow resistance and pressure drop.

The section of the core body shown in FIG. 12 includes a circle 900 at the radial center and six half circles 902 surrounding the central circle. These shapes represent parts of seven unit cells in a first row of the core body. Three small circular openings 904 are triangularly arranged around the central circle. The small openings represent portions of the dimples of lower cones of unit cells in row above. The circular segments 906 of the sidewalls that define the small openings are portions of the lower cones shown in FIG. 11.

The section of the core body shown in FIG. 13 includes three full unit cells and three partial, peripheral unit cells disposed in a second row above the cells in the first row shown in FIG. 12. The unit cells in the second row are sectioned by the cut line 13-13. The three full unit cells are spaced apart in a triangular arrangement. The outer passageways are defined in the spaces between the unit cells in the second row. In an embodiment, each of the full unit cells is built on top of and is individually connected (via edges of the orifices) to multiple unit cells in the underlying row. Each full unit cell may be disposed above portions of three underlying unit cells.

Within the circular outline of each unit cell is a portion 910 of the sidewall disposed between multiple orifices. That portion defines the base or bottom of the unit cell, and includes the lower cone. In FIG. 13, the portion of the sidewall that is visible has a generally triangular shape and is between three orifices. The three orifices are spaced apart 120 degrees along a circumference of the unit cell. The lower cone may be centrally located and equidistant between the three orifices disposed around the triangular portion. Each of the three orifices visible within each of the full unit cells is fluidly connected to a different unit cell in the row below. For example, the orifices connect each unit cell to the three underlying unit cells that the respective unit cell at least partially extends above and overlaps. When the first fluid flows through the inner passageway of a respective unit cell, the first fluid gets trifurcated into three connected cells. FIG. 13 also shows the top of the upper cone of the centrally-located unit cell.

The section of the core body shown in FIG. 14 includes three full unit cells and three partial, peripheral unit cells in a third row disposed on top of the cells in the second row. The arrangement of the unit cells in the third row is inverse (e.g., flipped relative to) the arrangement of the unit cells in the second row. For example, the three full unit cells in FIG. 14 are triangularly arranged, similar to FIG. 13, but the triangle is flipped 180 degrees relative to the triangular arrangement in FIG. 13. In an embodiment, the sidewalls of the full unit cells have three orifices that fluidly connect the respective unit cell to three different unit cells in the row above. For example, the cell 212a in the second row is fluidly connected to three cells 212b, 212c, 212d in the third row. The full unit cells according to the illustrated embodiment include six total orifices, including three orifices that connect to cells in a row below and three orifices that connect to cells in a row above. The first fluid can ingress a unit cell through one or more of the orifices and can egress the unit cell through one or more of the other orifices.

FIG. 15 is a plan view of the core body showing the top end. The top of the core body includes multiple, incomplete unit cells within a fourth row of the core body above the unit cells in the third row that are shown in cross-section in FIG. 14. The unit cells shown in FIG. 15 have a similar arrangement and shapes as the unit cells in the first row shown in FIG. 12. In an embodiment, each row of unit cells in the core body has one of three cell arrangements, and the rows alternate through the three cell arrangements in a repeating pattern along the height of the core body. The unit cells may be arranged in a different number of repeating configurations in an alternative embodiment.

Figure 16:
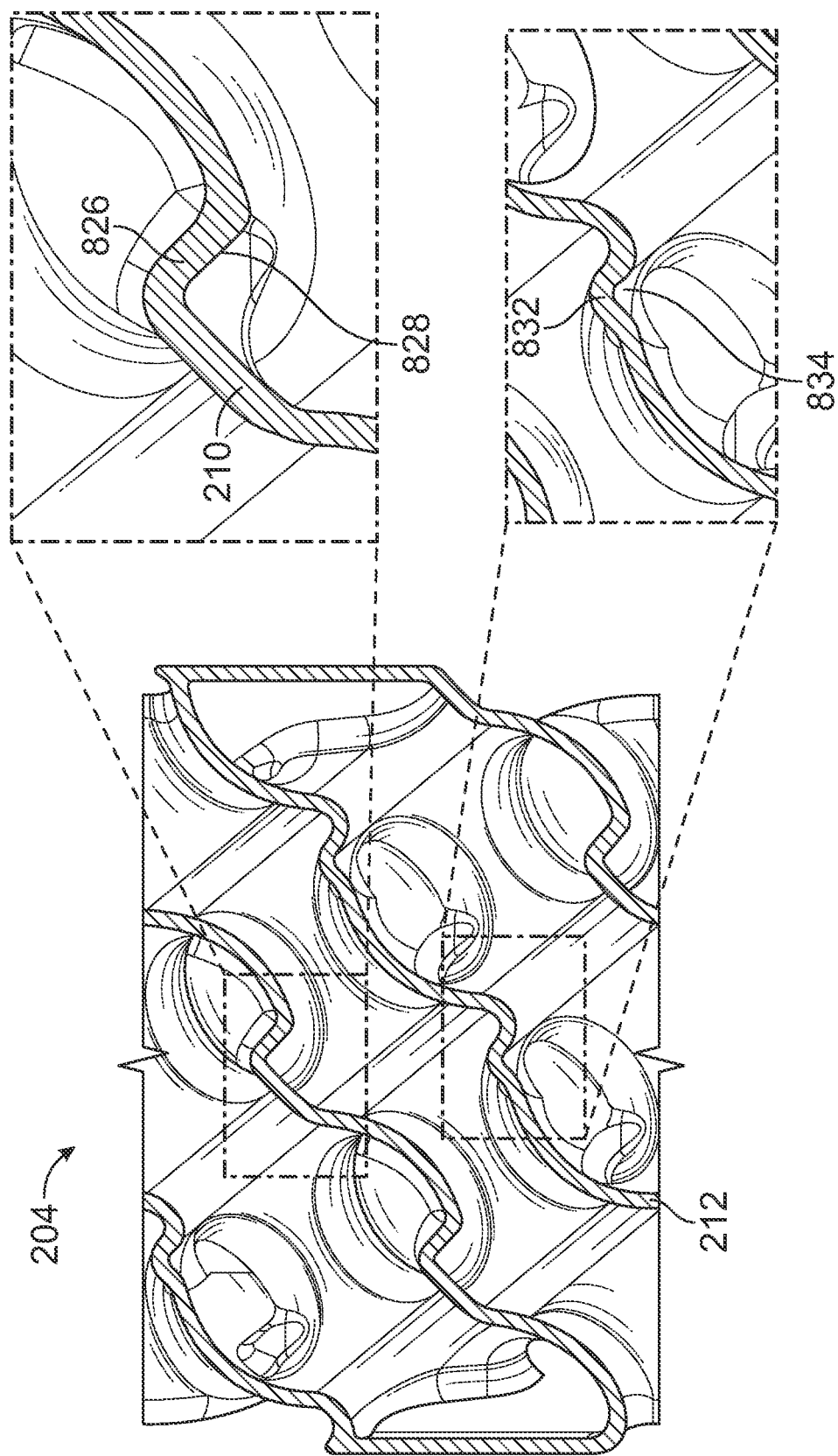
FIG. 16 is the cross-sectional view of the core body shown in FIG. 11 with enlarged areas showing upper and lower cones according to an embodiment.

FIG. 16 is the cross-sectional view of the core body shown in FIG. 11 with enlarged areas showing the upper and lower cones 832, 826 according to an embodiment. In the illustrated embodiment, the lower cone is larger than the upper cone. For example, the base of the lower cone is broader than the base of the upper cone. The lower cone also has a greater height from base to apex than the upper cone. The dimple 828 of the lower cone has a greater volume than the dimple 834 of the upper cone. The lower cone may be larger than the upper cone due to printability considerations. In an alternative embodiment, the upper and lower cones may have the same sizes or the upper cones may be larger than the lower cones.

The core body may be manufactured to have thin walls throughout. For example, wall thicknesses of the sidewalls may be less than 3 mm, even at the thickest sections. In an embodiment, the sidewall thicknesses are between 0.3 mm and 1.5 mm (inclusive of the endpoints). The diameter of the orifices may be significantly larger than the wall thickness. For example, the orifice diameter may be at least 3 mm. In an embodiment, the orifices may be at least ten times the wall thickness. The orifice diameter in such embodiment may be up to 15 mm or more. The sidewalls optionally may vary in thickness within this relatively narrow range. For example, the sidewalls along the lower cone may be thicker than the segments of the sidewalls that extend from the lower cone. Optionally, the sidewalls along the upper cone may also be thicker than the segments of the sidewalls extending from the upper cone. The lower cone wall thickness may be thicker than the upper cone wall thickness to support the larger size, and greater inflection, of the lower cone relative to the upper cone.

The thin walls enable the core body to have relatively large unit cells and orifices. For example, the unit cell dimensions, for full cells that are not distorted along the periphery of the core body, may be between 10 mm and 30 mm. For the spherical unit cells, the unit cell dimension refers to the inner diameter of the sidewalls. In an embodiment, the unit cell dimension is about 20 mm. The cell dimensions can be selected based on application-specific factors, such as fluid throughput and transfer properties, rather than printability considerations. For example, known core bodies with repeating geometries have significantly smaller cell sizes to avoid the use of internal support structures within the core body, or alternatively have larger cell sizes but include internal support structures. Known core bodies do not include large cell sizes without internal support structures.

Figure 17:
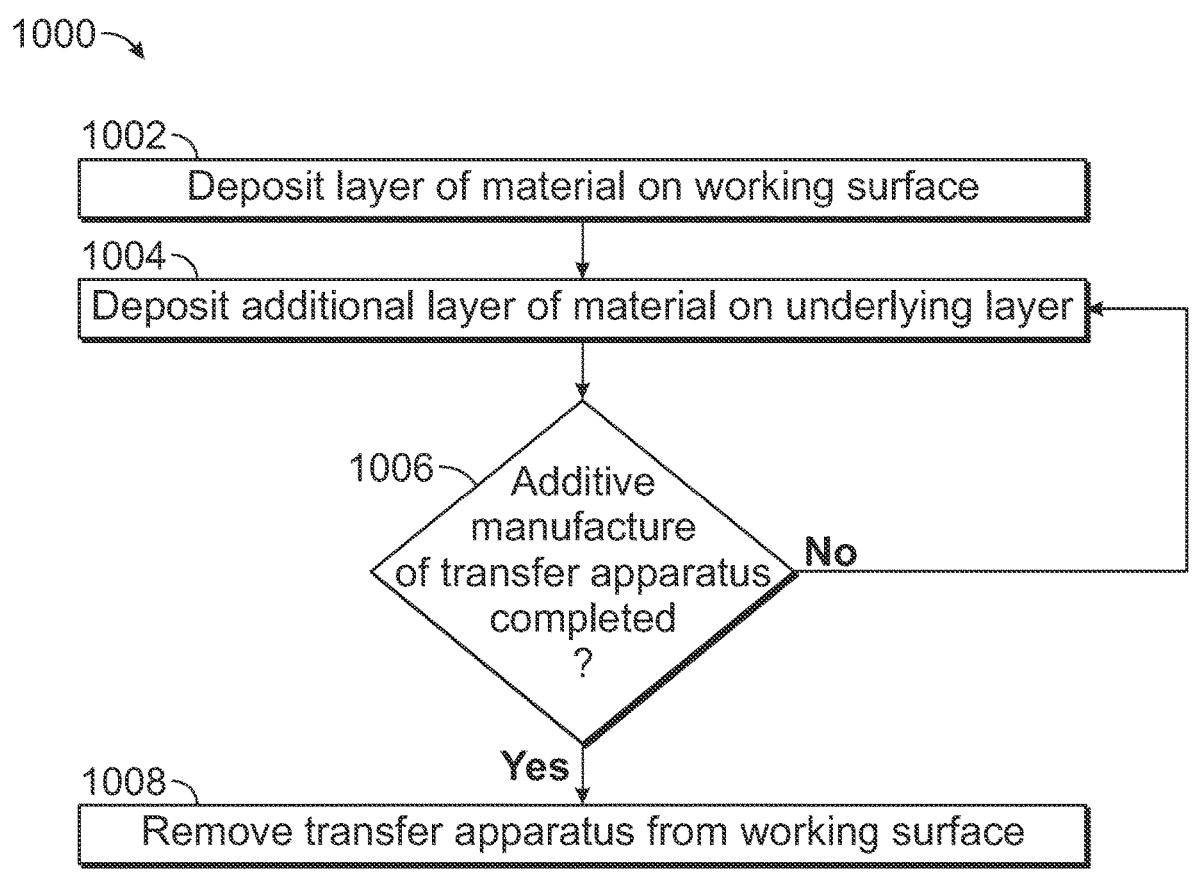
FIG. 17 illustrates a flowchart of one example of a method for creating a transfer apparatus or a component thereof.

FIG. 17 illustrates a flowchart of one example of a method 1000 for creating a transfer apparatus, or a component thereof. The method can be used to create one or more embodiments of the transfer apparatus shown and/or described herein. The method can be performed by an additive manufacturing system (e.g., a three-dimensional printing system) that automatically prints the transfer apparatus using an input file. Suitable input file formats may include STL, OBJ, AMF, 3MF, or the like. At step 1002, a layer of material is deposited onto a working surface. For example, a first layer of material used to form the transfer apparatus can be printed onto a working surface from one or more filaments.

At step 1004, at additional layer of material is deposited onto the underlying layer of material. This additional layer can be at least partially printed onto the layer of material that was deposited prior to this additional layer. At step 1006, a decision is made as to whether manufacture of the transfer apparatus is complete. If additional layers are to be deposited to complete forming of the entire transfer apparatus, then flow of the method can return toward step 1004 so that one or more additional layers can be deposited as described above (until creation of the transfer apparatus is complete). The layers can be sequentially deposited at least partially on top of each other to form the shapes of the shell, flexible diaphragm, and the core body. By "at least partially," it is meant that the entire layer or less than the entire layer can be printed on top of an underlying layer. If creation of the transfer apparatus is complete, then flow of the method can proceed toward step 1008. At step 1008, the transfer apparatus is removed from the working surface. The transfer apparatus can then be used to transfer energy and/or components between fluids, as described above.

Optionally, the method can be used to form a component of the transfer apparatus (without forming at least one other component of the transfer apparatus. For example, a core body may be additively manufactured by sequentially depositing layers of material at least partially on top each other in a build direction. The additive manufacturing can be performed by a three-dimensional printing system, according to instructions in an input design file, to produce the core body according to the embodiments described herein. For example, the method can be performed to print the core body shown in FIGS. 10 through 16.

Suitable processes include, for example, laser powder bed fusion, electron beam powder bed fusion, directed energy deposition (DED), and binder jetting. Laser powder bed fusion involves depositing a layer of powder on a build plate and fusing selective portions of the power using a ytterbium fiber laser that scans a CAD pattern. Laser powder bed fusion may include selective laser melting or sintering. At least portions of the core body and/or transfer apparatus could be printed using DED, which prints at a very fast rate. For example, DED could be used to print the shell of the transfer apparatus, which could then be fused directly with the flexible diaphragm that connects to the core body. Binder jetting creates a part by intercalating metal powder and polymer binding agent that bind the particles and layers together without the use of laser heating. The material of the core body may be selected based at least in part on the proposed method of additive manufacturing. For example, the binderjet materials that include the binder and the metal (or ceramic, or cermet) may make the green form (e.g., the shape prior to sintering). The green form might be in the final shape, or may be shaped so that the sintered form is the final shape.

The core body of the transfer apparatus according to the embodiments described herein is a three-dimensional structure with a web of interconnected unit cells arranged in a regular, repeating pattern. Properties and characteristics of the core body may be selected based on application-specific parameters and desired functionality. For example, properties such as the shape of individual (and repeated) cells within the structure can be selected to increase structural strength, thermally conductivity, flow volume or throughput through the core body, surface area for fluid-membrane interactions, and the like. Optionally, the angles or slopes of the sidewalls, the thickness of the sidewalls, the material composition of the sidewalls, the size of the sidewalls, and other characteristics of the sidewalls such as the density, relative density, porosity, or the like, can be selected to obtain a desired strength, conductivity, surface area, density, heat dissipation ability, etc. The relative density represents the density of the material divided by the density of the core body. The porosity represents a measurement of the amount of void material (e.g., air) occupying the volume.

The properties may be uniform throughout the core body. Alternatively, may vary along the height, radial thickness, or the like of the core body, such that one or more properties in one area of the core body may differ from another area of the core body. Unit cells may vary in shape, size, thickness or spacing throughout the core structure, to improve the performance characteristics of the heat exchanger. For example, the unit cell sizes (e.g., diameters), orifice diameters, spacing between unit cells, ratios between the sizes of the inner passageways and the outer passageways, and/or sidewall thicknesses can be selectively varied to control fluid flow, heat transfer, material transfer (e.g., filtering) into and/or through the sidewalls, and/or the like. Varying the flow resistance can help spread fluid to areas that may naturally receive less fluid flow than other areas. The unit cells closer to the radial center of the core body may be smaller or closer together than the unit cells closer to the periphery or outer side of the core body. The small sizes may increase flow resistance through the more centrally-located inner passageways and/or outer passageways, which may force more fluid towards the periphery.

The core body may be formed of at least one plastic, ceramic, and/or metal material. The plastic material may include or represent an epoxy resin, a vinylester, a polyester thermosetting polymer (e.g., polyethylene terephthalate (PET)), polypropylene, or the like. The ceramic material may include or represent silica, alumina, silicon nitride, or the like. The metal material may include or represent aluminum alloys, titanium alloys, cobalt chrome alloys, stainless steel, nickel alloys, or the like. The core body may be a composite including a mixture of multiple materials, such as a plastic with a ceramic, a ceramic with a metal (known as a cermet composite material), and/or a plastic with a metal. Optionally, the core body may represent a reinforced composite, such as a fiber-reinforced plastic. The fiber-reinforced plastic may include embedded fibers within a matrix layer of the plastic. The fibers may be carbon fibers, glass fibers, aramid fibers (e.g., Kevlar®), basalt fibers, naturally-occurring biological fibers such as bamboo, and/or the like. The reinforced composite may be reinforced with other shapes of material other than fibers, such as a powder or strips in other embodiments. The reinforcements may be embedded within any of the plastics listed above. The cermet composite material may be composed of any of the ceramics and the metals listed above. For the additive printing process, the materials may be provided in particle form, such as in a powder, and the printing system selectively fuses the particles together to form each layer of the solid build part.

The additive manufacturing system and/or post-printing instruments may be controlled to determine and to provide the core body with a specific surface finish that affects how the core body interacts with the fluids flowing through the core body. For example, a rougher surface finish may increase flow resistance, increase thermal transfer, and/or increase material transfer through the sidewalls relative to smoother surface finishes. Optionally, the surface finish may be varied along the core body to selectively control the fluid flow and/or transfer conditions throughout the core body. Each aspect may be determined using methods disclosed herein.

In one or more embodiments, a core body (e.g., for a transfer apparatus) includes a structure having a plurality of connected unit cells, and at least one unit cell of the plurality of connected unit cells has one or more sidewalls that are curved and have an inner surface that defines at least a portion of an inner passageway within and through the unit cell. The one or more sidewalls of the unit cell define multiple orifices such that a first fluid can ingress the unit cell through one of the orifices and can egress the unit cell through another of the orifices. The one or more sidewalls include a cone disposed between at least some of the orifices of the unit cell. The one or more sidewalls have an outer surface, and a dimple is defined along the outer surface at the cone. The one or more sidewalls have an edge that extends around the orifices of the unit cell. The edges of different unit cells connect to each other, and the outer surface at least partially defines an outer passageway that is sealed from the inner passageway by the one or more sidewalls of the unit cell. The outer passageway is configured to enable flow of a second fluid therethrough. The one or more sidewalls of the unit cell are configured to transport one or more of thermal energy from the first fluid or a component of the first fluid flowing in the inner passageway to the second fluid flowing in the outer passageway without the first fluid mixing with the second fluid.

Optionally, the cone projects toward a center point of the unit cell. Optionally, the unit cell defines at least three orifices and the cone is located equidistant from at least three of the orifices. The cone may be located equidistant from three of the orifices that are spaced apart 120 degrees along a circumference of the unit cell. Optionally, the unit cell has a spherical shape defined by portions of the one or more sidewalls of the unit cell between the orifices and spaced apart from the cone. A wall thickness of the sidewalls of the unit cell may be no less than 0.3 mm and no greater than 1.5 mm. A diameter of the orifices of the unit cell may be at least ten times the wall thickness of the one or more sidewalls of the unit cell. Optionally, a diameter of the orifices of the unit cell is greater than a diameter of the outer passageway. Optionally, the core body is a single monolithic body, and the multiple unit cells are connected together at seamless interfaces. The structure may be composed of a metal material, a polymer material, or both a metal material and a polymer material. Optionally, the unit cells are arranged in rows that are stacked at least partially on top of one another, and a line extending from a center point of one unit cell in a first row to a center point of another unit cell in a second row defines an angle no less than 30 degrees and no greater than 60 degrees relative to a plane of the first row.

Optionally, the cone is a first cone and the one or more sidewalls of the unit cell include a second cone disposed between a different set of the orifices of the unit cell than the orifices between which the first cone is disposed. The first cone and the second cone project in a common direction. The structure has a height that extends from a bottom end of the structure to a top end of the structure, and the first cone of the unit cell is disposed below the second cone of the unit cell along the height. The first cone may have a greater size than the second cone.

In one or more embodiments, a core body (e.g., for a transfer apparatus) includes a structure having a plurality of connected unit cells, and at least one unit cell of the plurality of connected unit cells has one or more sidewalls that are curved and have an inner surface that defines at least a portion of an inner passageway within and through the unit cell. The one or more sidewalls of the unit cell define at least four orifices such that a first fluid can ingress the unit cell through one of the orifices and can egress the unit cell through another of the orifices. A portion of the one or more sidewalls disposed between three of the orifices has a triangular shape, and the three orifices are spaced apart 120 degrees along a circumference of the unit cell. The one or more sidewalls have an edge that extends around the orifices of the unit cell. The edges of different unit cells connect to each other to at least partially define outer passageways that are sealed from the inner passageway of the unit cell and inner passageways of other unit cells by the one or more sidewalls of the unit cells. The outer passageways are configured to enable flow of a second fluid therethrough. The one or more sidewalls of the unit cells are configured to transport one or more of thermal energy from the first fluid or a component of the first fluid flowing in the inner passageways to the second fluid flowing in the outer passageways without the first fluid mixing with the second fluid.

Optionally, the portion of the one or more sidewalls that has the triangular shape includes a cone. The one or more sidewalls have an outer surface and a dimple is defined along the outer surface at the cone. The cone may project toward a center point of the unit cell. Optionally, the core body is a single monolithic body, and the multiple unit cells are connected together at seamless interfaces. Optionally, the unit cells are arranged in rows that are stacked at least partially on top of one another. A line extending from a center point of one unit cell in a first row to a center point of another unit cell in a second row may define an angle no less than 30 degrees and no greater than 60 degrees relative to a plane of the first row. Optionally, the unit cell defines no more or less than six orifices.

In one or more embodiments, a method for forming a core body of a transfer apparatus includes additively manufacturing a core body by sequentially depositing layers of material at least partially on top each other in a build direction to form a structure comprised of a plurality of connected unit cells. At least one unit cell of the plurality of connected unit cells has one or more sidewalls that are curved and have an inner surface that defines at least a portion of an inner passageway within and through the unit cell. The one or more sidewalls of the unit cell define multiple orifices such that a first fluid can ingress the unit cell through one of the orifices and can egress the unit cell through another of the orifices. The one or more sidewalls include a cone disposed between at least some of the orifices of the unit cell. The one or more sidewalls have an outer surface, and a dimple is defined along the outer surface at the cone. The one or more sidewalls have an edge that extends around the orifices of the unit cell, and the edges of different unit cells connect to each other. The outer surface at least partially defines an outer passageway that is sealed from the inner passageway by the one or more sidewalls of the unit cell. The outer passageway is configured to enable flow of a second fluid therethrough. The one or more sidewalls of the unit cell may transport one or more of thermal energy from the first fluid or a component of the first fluid flowing in the inner passageway to the second fluid flowing in the outer passageway without the first fluid mixing with the second fluid.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Other examples are intended to be within the scope of the claims if they have structural elements that do not differ from the literal language of the claims, or if they include equivalent structural elements with insubstantial differences from the literal language of the claims.

What is claimed is:

1. A core body comprising:
a structure having a plurality of connected unit cells, and at least one unit cell of the plurality of connected unit cells has one or more sidewalls that are curved and have an inner surface that defines at least a portion of an inner passageway within and through the unit cell, the one or more sidewalls of the unit cell defining multiple orifices such that a first fluid can ingress the unit cell through one of the orifices and can egress the unit cell through another of the orifices, the one or more sidewalls including a cone disposed between at least some of the orifices of the unit cell, and the one or more sidewalls having an outer surface and a dimple defined along the outer surface at the cone, and the one or more sidewalls having an edge that extends around the orifices of the unit cell, wherein the edges of different unit cells connect to each other and the outer surface at least partially defines an outer passageway that is sealed from the inner passageway by the one or more sidewalls of the unit cell, the outer passageway configured to enable flow of a second fluid therethrough, and the one or more sidewalls of the unit cell configured to transport one or more of thermal energy, a component of the first fluid, or a component of the second fluid through the one or more sidewalls without the first fluid mixing with the second fluid.

2. The core body of claim 1, wherein the cone projects toward a center point of the unit cell.

3. The core body of claim 1, wherein the unit cell defines at least three orifices and the cone is located equidistant from at least three of the orifices.

4. The core body of claim 3, wherein the cone is located equidistant from three of the orifices that are spaced apart 120 degrees along a circumference of the unit cell.

5. The core body of claim 1, wherein the unit cell has a spherical shape defined by portions of the one or more sidewalls of the unit cell between the orifices and spaced apart from the cone.

6. The core body of claim 1, wherein a wall thickness of the sidewalls of the unit cell is no less than 0.3 mm and no greater than 1.5 mm.

7. The core body of claim 1, wherein a diameter of the orifices of the unit cell is at least ten times a wall thickness of the one or more sidewalls of the unit cell.

8. The core body of claim 1, wherein the core body is a single monolithic body, and the multiple unit cells are connected together at seamless interfaces.

9. The core body of claim 1, wherein the structure is composed of one or more of a metal material or a polymer material.

10. The core body of claim 1, wherein the unit cells are arranged in rows that are stacked at least partially on top of one another, and a line extending from a center point of one unit cell in a first row to a center point of another unit cell in a second row defines an angle no less than 30 degrees and no greater than 60 degrees relative to a plane of the first row.

11. The core body of claim 1, wherein a diameter of the orifices of the unit cell is greater than a diameter of the outer passageway.

12. The core body of claim 1, wherein the cone is a first cone and the one or more sidewalls of the unit cell include a second cone disposed between a different set of the orifices of the unit cell than the orifices between which the first cone is disposed, the first cone and the second cone project in a common direction.

13. The core body of claim 12, wherein the structure has a height that extends from a bottom end of the structure to a top end of the structure, the first cone of the unit cell being disposed below the second cone of the unit cell along the height, and the first cone having a greater size than the second cone.

14. A core body comprising:
a structure having a plurality of connected unit cells, and at least one unit cell of the plurality of connected unit cells has one or more sidewalls that are curved and have an inner surface that defines at least a portion of an inner passageway within and through the unit cell, the one or more sidewalls of the unit cell defining at least four orifices such that a first fluid can ingress the unit cell through one of the orifices and can egress the unit cell through another of the orifices, a portion of the one or more sidewalls disposed between three of the orifices having a triangular shape and including a cone that projects toward a center point of the unit cell,
the one or more sidewalls having an edge that extends around the orifices of the unit cell, wherein the edges of different unit cells connect to each other to at least partially define outer passageways that are sealed from the inner passageway of the unit cell and inner passageways of other unit cells by the one or more sidewalls of the unit cells, the outer passageways configured to enable flow of a second fluid therethrough, and the one or more sidewalls of the unit cells configured to transport one or more of thermal energy, a component of the first fluid, or a component of the second fluid through the one or more sidewalls without the first fluid mixing with the second fluid.

15. The core body of claim 14, wherein the one or more sidewalls have an outer surface, and a dimple is defined along the outer surface at the cone.

16. The core body of claim 14, wherein the core body is a single monolithic body, and the multiple unit cells are connected together at seamless interfaces.

17. The core body of claim 14, wherein the unit cells are arranged in rows that are stacked at least partially on top of one another, and a line extending from the center point of one unit cell in a first row to the center point of another unit cell in a second row defines an angle no less than 30 degrees and no greater than 60 degrees relative to a plane of the first row.

18. The core body of claim 14, wherein the unit cell defines no more or less than six orifices.

19. The core body of claim 14, wherein the cone is a first cone and the one or more sidewalls of the unit cell include a second cone spaced apart from the first cone, the first cone and the second cone projecting in a common direction.

20. A method comprising:
additively manufacturing a core body by sequentially depositing layers of material at least partially on top of each other in a build direction to form a structure comprised of a plurality of connected unit cells, and at least one unit cell of the plurality of connected unit cells has one or more sidewalls that are curved and have an inner surface that defines at least a portion of an inner passageway within and through the unit cell, the one or more sidewalls of the unit cell defining multiple orifices such that a first fluid can ingress the unit cell through one of the orifices and can egress the unit cell through another of the orifices, the one or more sidewalls including a cone disposed between at least some of the orifices of the unit cell, and the one or more sidewalls having an outer surface and a dimple defined along the outer surface at the cone, and
the one or more sidewalls having an edge that extends around the orifices of the unit cell, wherein the edges of different unit cells connect to each other and the outer surface at least partially defines an outer passageway that is sealed from the inner passageway by the one or more sidewalls of the unit cell, the outer passageway configured to enable flow of a second fluid therethrough, and the one or more sidewalls of the unit cell configured to transport one or more of thermal energy, component of the first fluid, or a component of the second fluid through the one or more sidewalls without the first fluid mixing with the second fluid.

* * * * *